US011930477B2

(12) United States Patent
Sanchez et al.

(10) Patent No.: US 11,930,477 B2
(45) Date of Patent: Mar. 12, 2024

(54) ALIGNING PAGING OCCASIONS ACROSS AT LEAST TWO IDENTITIES

(71) Applicant: NOKIA TECHNOLOGIES OY, Espoo (FI)

(72) Inventors: Laura Luque Sanchez, Nibe (DK); Devaki Chandramouli, Plano, TX (US); Jakob Lindbjerg Buthler, Aalborg (DK); Faranaz Sabouri-Sichani, Aalborg (DK); Frank Frederiksen, Klarup (DK); Nuno Manuel Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/443,441

(22) Filed: Jul. 26, 2021

(65) Prior Publication Data

US 2022/0030549 A1    Jan. 27, 2022

(30) Foreign Application Priority Data

Jul. 27, 2020  (FI) ...................................... 20205769

(51) Int. Cl.
*H04W 68/02* (2009.01)
*H04W 72/23* (2023.01)
*H04W 88/06* (2009.01)

(52) U.S. Cl.
CPC ........... *H04W 68/02* (2013.01); *H04W 72/23* (2023.01); *H04W 88/06* (2013.01)

(58) Field of Classification Search
CPC ..... H04W 68/02; H04W 72/23; H04W 88/06; H04W 68/00; H04W 52/0209; Y02D 30/70

USPC ......................................................... 455/458
See application file for complete search history.

(56) References Cited

U.S. PATENT DOCUMENTS

| 10,492,169 | B2 | 11/2019 | Chen et al. | |
| 10,623,946 | B1* | 4/2020 | Kumar | H04W 76/16 |
| 2009/0215472 | A1 | 8/2009 | Hsu et al. | |
| 2012/0088502 | A1* | 4/2012 | Chin | H04W 52/0216 |
| | | | | 455/433 |
| 2014/0080496 | A1* | 3/2014 | Terry | H04W 68/00 |
| | | | | 455/458 |

(Continued)

FOREIGN PATENT DOCUMENTS

| CN | 101605361 A | 12/2009 |
| CN | 10398855 A | 8/2014 |

(Continued)

OTHER PUBLICATIONS

Search Report for Finnish Patent Application No. 20205769, dated Nov. 24, 2020, 2 pages.

(Continued)

*Primary Examiner* — Hirdepal Singh
(74) *Attorney, Agent, or Firm* — Brake Hughes Bellermann LLP

(57) ABSTRACT

There is provided reduced power consumption in devices that use at least two identities for communications. A method comprises aligning (1302) a plurality of paging occasions across at least two identities of a communication device. The aligning is performed via requesting and receiving (1306) from a communication network a paging occasion for the communication device with at least two identities using at least one of the identities.

21 Claims, 27 Drawing Sheets

(56) References Cited

U.S. PATENT DOCUMENTS

| | | | |
|---|---|---|---|
| 2015/0017982 A1* | 1/2015 | Klatt | H04W 68/00 |
| | | | 455/434 |
| 2018/0146398 A1 | 5/2018 | Kim et al. | |
| 2018/0368101 A1 | 12/2018 | Agiwal et al. | |
| 2019/0281580 A1* | 9/2019 | Rune | H04W 76/28 |
| 2020/0280919 A1* | 9/2020 | Hoglund | H04W 24/08 |
| 2020/0404617 A1* | 12/2020 | Murray | H04W 68/02 |
| 2021/0337505 A1* | 10/2021 | Krishnamoorthy | |
| | | | H04W 56/001 |
| 2022/0240213 A1* | 7/2022 | Ly | H04W 60/04 |
| 2022/0369097 A1* | 11/2022 | Ioffe | H04W 76/28 |

FOREIGN PATENT DOCUMENTS

| | | |
|---|---|---|
| CN | 104137633 A | 11/2014 |
| CN | 104982050 A | 10/2015 |
| CN | 110192414 A | 8/2019 |
| CN | 11294789 A | 6/2020 |
| CN | 111356231 A | 6/2020 |
| JP | 2019532580 A | 11/2019 |
| WO | 2016140274 A1 | 9/2016 |
| WO | 2018084632 A1 | 5/2018 |
| WO | 2018176219 A1 | 10/2018 |
| WO | 2020111912 A1 | 6/2020 |
| WO | 2021075850 A1 | 4/2021 |

OTHER PUBLICATIONS

Communication of Acceptance for Finnish Patent Application No. 20205769, dated Jun. 23, 2021, 7 pages.

European Search Report for Application No. 21187724.6, dated Jan. 18, 2022, 8 pages.

Office Action for Japanese Application No. 2021-122698, dated Oct. 3, 2022, 3 pages.

Office Action for Japanese Patent Application No. 2021-1226989, dated Jul. 6, 2023, 7 pages.

Office Action and Search Report for Chinese Application No. 202110851105.8, dated Dec. 26, 2023, 10 pages.

SA WG2 Meeting #S2-136AH, S2-2000841; "KI2: Solution for Paging Reception with PO Collision Avoidance"; Source: Sony; Agenda Item: 8.4; Incheon, KR, Jan. 13-17, 2020; 5 pages.

* cited by examiner

| UEAssistanceInformation field descriptions |
|---|
| *delayBudgetReport* |
| *reducedBW-FR1-DL* |
| *reducedBW-FR1-UL* |
| *reducedBW-FR2-DL* |
| *reducedBW-FR2-UL* |
| *reducedCCsDL* |
| *reducedCCsUL.* |
| *reducedMIMO-LayersFR1-DL* |
| *reducedMIMO-LayersFR1-UL* |
| *reducedMIMO-LayersFR2-DL* |
| *reducedMIMO-LayersFR2-UL* |
| *type1* |
| *preferredPagingOccasion* <- New element<br>Indicates the Paging Occasion for full or sequential alignment, or the current Paging Occasion allocated to the other USIM in the device. Values could be given as an absolute time, as a time offset relative to the current system timing (based on system frame number), or as a time offset from the current Paging Occasion. |

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| UE Paging Identity | M | | 9.3.3.18 | | YES | ignore |
| Paging DRX | O | | 9.3.1.90 | | YES | ignore |
| TAI List for Paging | | 1 | | | YES | ignore |
| >TAI List for Paging Item | | 1..<maxnoofT AIforPaging> | | | | |
| >>TAI | M | | 9.3.3.11 | | - | - |
| Paging Priority | O | | 9.3.1.78 | | YES | ignore |
| UE Radio Capability for Paging | O | | 9.3.1.68 | | YES | ignore |
| Paging Origin | O | | 9.3.2.22 | | YES | ignore |
| Assistance Data for Paging | O | | 9.3.1.68 | | YES | ignore |

FIG. 9

2000 

2002 Receiving from the communication network information indicating that the requesting a paging occasion from the communication network using another identity is not assigned

2004 Requesting a paging occasion from the communication network in accordance with at least one further alignment of paging occasions using the identity used for requesting the paging occasion in accordance with the prioritized alignment

2202 Receiving from the communication network information indicating that the requested paging occasion in accordance with the determined at least one alignment for paging occasions for prioritizing signaling load for the at least one of the identities is not assigned to the communication device

↓

2204 Determining at least one alignment for prioritizing signaling load for paging occasions for another identity of the identities

↓

2206 Requesting, using the another identity, a paging occasion from the communication network in accordance with the determined at least one alignment for prioritizing signaling load for paging occasions for said another identity

FIG. 22

ALIGNING PAGING OCCASIONS ACROSS AT LEAST TWO IDENTITIES

CROSS-REFERENCE TO RELATED APPLICATIONS

This application claims priority to Finnish patent application No. 20205769, filed Jul. 27, 2020, entitled "ALIGNING PAGING OCCASIONS ACROSS AT LEAST TWO IDENTITIES" which is hereby incorporated by reference in its entirety.

TECHNICAL FIELD

The examples and non-limiting embodiments relate generally to communications and, more particularly, to a reducing power consumption in devices that use at least two identities for communications with communications networks. Examples of these devices comprise MUSIM devices enabled with at least dual receive capabilities.

BACKGROUND

It is known to implement technology to support devices with multiple subscriptions.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

The foregoing aspects and other features are explained in the following description, taken in connection with the accompanying drawings, wherein:

FIG. 7 shows the UE Assistance Information field descriptions, based on TS38.331, including an added field for the UE's preferred paging occasion.

FIG. 9 shows a message content sent by the AMF used to page a UE in one or several tracking areas.

FIG. 20 shows another example method for reducing power consumption in dual receive capable MUSIM devices, based on the examples described herein.

FIG. 22 shows another example method for reducing power consumption in dual receive capable MUSIM devices, based on the examples described herein.

DETAILED DESCRIPTION OF EXAMPLE EMBODIMENTS

As used within this description and drawings, "/" may be interpreted as a recitation of "or", "and", or "both".

Figure 1:
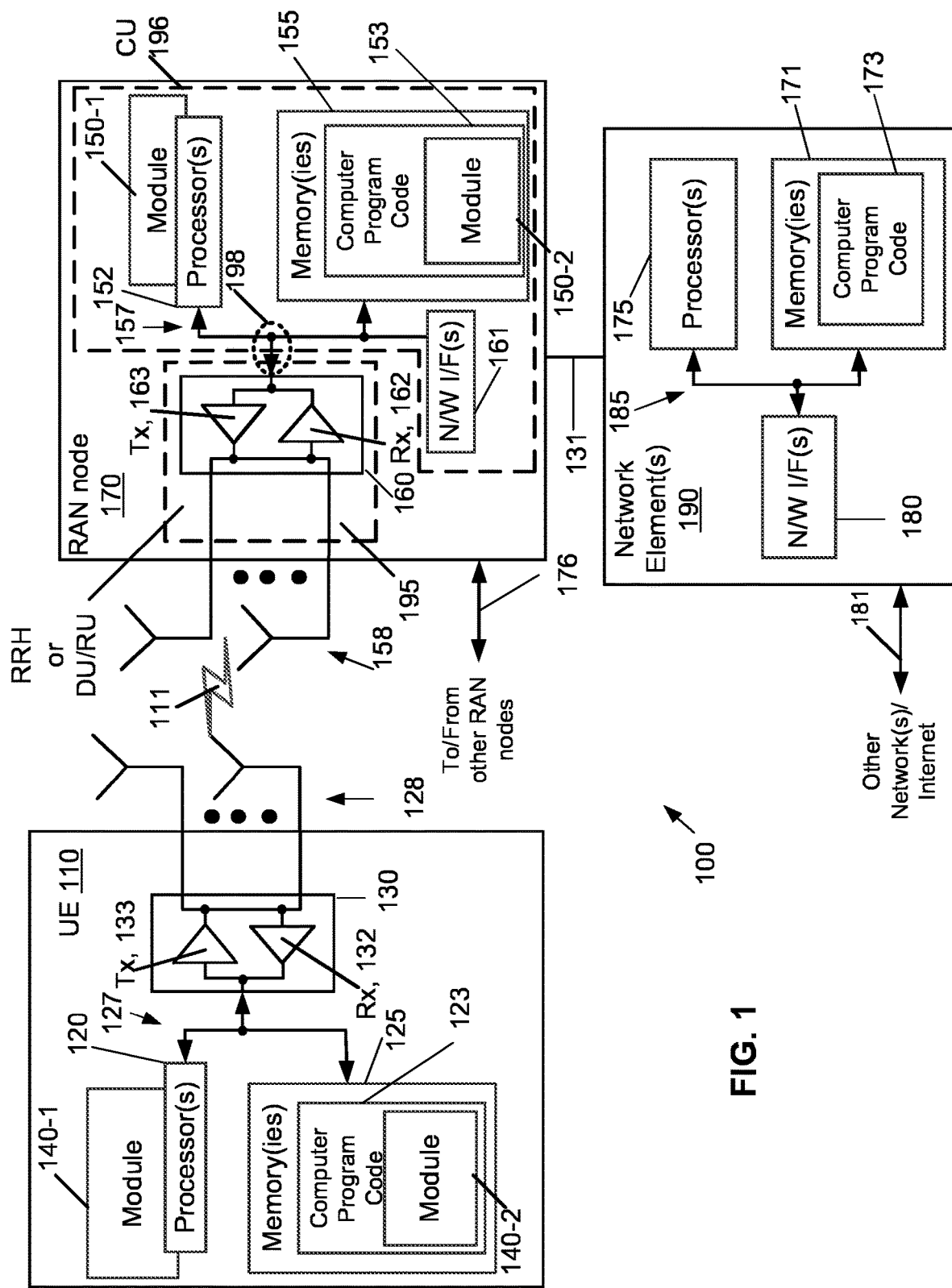
FIG. 1 is a block diagram of one possible and non-limiting system in which the example embodiments may be practiced.

The following acronyms and abbreviations that may be found in the specification and/or the drawing figures are defined as follows:
  3GPP 3rd generation partnership project
  3GPP2 3rd generation partnership project 2
  5G fifth generation
  5GC 5G core network
  5G-GUTI 5G NR global unique temporary identifier
  5GS 5G system
  5G-S-TMSI 5G SAE temporary mobile subscriber identity;
  48 bit long bit string (TS 23.501) and assigned by the AMF
  AMF access and mobility management function
  BB baseband
  BW bandwidth
  CC component carrier
  CU central unit or centralized unit
  DL downlink
  DRX discontinuous reception
  DU distributed unit
  DSDA dual SIM dual active
  DSDS dual SIM dual standby
  DR-DSDS Dual receive dual SIM dual standby
  DSP digital signal processor
  e.g. for example
  eMBB enhanced mobile broad band
  eNB evolved node B (e.g., an LTE base station)
  EN-DC E-UTRA-NR dual connectivity
  en-gNB node providing NR user plane and control plane protocol terminations towards the UE, and acting as a secondary node in EN-DC
  EPC evolved packet core
  EPS evolved packet system
  eSIM electronic (or embedded) subscriber identity module
  E-UTRA evolved universal terrestrial radio access, i.e., the LTE radio access technology
  F1 control interface between CU and DU
  FR1 frequency range 1
  FR2 frequency range 2
  FS feature or study item
  gNB base station for 5G/NR, i.e., a node providing NR user plane and control plane protocol terminations towards the UE, and connected via the NG interface to the 5GC
  GUTI global unique temporary identifier
  HW hardware
  i.e. that is
  I/F interface
  ID identifier
  IE information element
  IMSI international mobile subscriber identity
  info information
  I/O input/output
  LMF location management function
  LTE long term evolution
  M mandatory
  MAC medium access control
  max maximum
  MIMO multiple-input multiple-output
  MME mobility management entity
  MNO mobile network operator
  MT mobile termination
  MUMA multi USIM multi active
  MUMS multi USIM multi standby
  MUSIM multi universal subscriber identity module
  MVNO mobile virtual network operator
  NACK negative acknowledgement
  NAS non-access stratum
  ng or NG new generation
  ng-eNB new generation eNB
  NG-RAN new generation radio access network
  no number
  NR new radio
  N/W or NW network
  O optional
  O&M operation and maintenance
  PDCP packet data convergence protocol
  PF paging frame
  PHY physical layer
  PLMN public land mobile network
  PO paging occasion
  RAN radio access network
  RAN2 RAN WG2 or radio layer 2
  RAT radio access technology
  Rel- release
  RF radio frequency
  RLC radio link control
  RNTI radio network temporary identifier
  RP- 3GPP RAN
  RRC radio resource control
  RRH remote radio head
  RU radio unit
  Rx or RX receiver or interchangeably receive
  SA system aspects
  SA2 service and system aspects working group 2
  SAE system architecture evolution
  SDAP service data adaptation protocol
  SFN system frame number
  SGW serving gateway
  SIM subscriber identity module
  SMF session management function
  SP 3GPP SA
  S-TMSI SAE TMSI
  SUPI subscription permanent identifier
  TAI tracking area identifier
  TMSI temporary mobile subscriber identity
  TR technical report
  TS technical specification
  TSG technical specification group
  Tx or TX transmitter or interchangeably transmit
  UE user equipment
  UL uplink
  UPF user plane function
  USIM universal subscriber identity module
  v. version
  VoLTE voice over LTE
  VoNR voice over NR
  WG working group
  WT work task Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111. The modules 140-1 and 140-2 may be configured to implement the functionality of the UE as described herein.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

FIG. 1 shows a single UE 110 communicating to the NW (RAN 170+Core 190). Example embodiments relevant for this invention is for devices with multiple subscriptions which are seen as independent UEs on NW side. As the UE 110 has multiple subscriptions, the UE 110 also comprises subscription 1 192, subscription 2 194, up to subscription N 196, where N is greater than or equal to 2. The NW itself can be from the same or different PLMN/MNO. The multiple subscriptions may be in the form of SIMs, USIMs, e-SIMs, certificates, or another other type of identity. Therefore, it should be appreciated that "identity" used herein may refer to an identity associated with a subscription to a communications network and when used by a communication device for communications with the communications network, the communication device may be identified by the communications network as a device holding a subscription to the communications network.

Module 140-1 and/or module 140-2 may implement the functionalities and signaling of the MUSIM UE or MUSIM as herein described. While module 140-1 and module 140-2 are shown in FIG. 1 as being different from subscription 1 192, subscription 2 194 and subscription N 196, the signaling functionality described herein is implemented by units representing the subscriptions, such that subscription 1 192, subscription 2 194, and subscription N 196 are functional units that implement the signaling described herein.

Module 150-1 and/or module 150-2 may implement the functionalities and signaling of the gNB or radio node as herein described. Computer program code 173 may implement the functionalities and signaling of the AMF or network element as herein described.

Overview

The examples described herein relate to support for multi-USIM devices mainly in 5G NR and LTE. 3GPP Release 17 has approved study and normative work to provide support of MUSIM devices on Service and System Aspects (SA). Refer to SP-190248, "Study on system enablers for multi-USIM devices (FS_MUSIM)", and the corresponding Technical Reports TR 22.834 and TR 23.761 for SA work.

The work tasks for SA work were defined in SA TSG Meeting #86 and given below:
"WT #1: Handling of MT service with Multi-USIM device.
How to handle the MT service for a Multi-USIM device with the aim of avoiding any unnecessary interruptions of the service in the current system and to save system resources.
WT #2: Enabling paging reception in Multi-USIM device
How the system can enable operation when the paging associated with the 3GPP RATs and systems in which the Multi-USIM device is in Idle state or RRC_Inactive state (for 5GS) overlap in time
WT #3: Coordinated leaving for Multi-USIM device
How to enable a Multi-USIM device to leave the current 3GPP system in coordination with the network while avoiding wasting the network resource during the leave."

Likewise, a work item is defined in Radio Access Network (RAN) to specify RAN related MUSIM support. Refer to RP-193263 "Support for Multi-SIM devices in Rel-17 (LTE_NR_MUSIM)", where the main objectives of the RAN work item are given as follows:

"The detailed objectives of the Work Item are:
1) Specify, if necessary, enhancement(s) to address the collision due to reception of paging when the UE is in IDLE/INACTIVE mode in both the networks associated with respective SIMs [RAN2]
   RAT Concurrency: Network A can be NR. Network B can either be LTE or NR.
   Applicable UE architecture: Single-Rx/Single-Tx.
2) Specify mechanism for UE to notify Network A of its switch from Network A (for MUSIM purpose) [RAN2]:
   RAT Concurrency: Network A is NR. Network B can either be LTE or NR.
   Applicable UE architecture: Single-Rx/Single-Tx, Dual-Rx/Single-Tx
3) Unless SA2 find an alternative solution or decides otherwise, specify mechanism for an incoming page to indicate to the UE whether the service is voLTE/VoNR.[ RAN2]
   RAT Concurrency: Network A is either LTE or NR. Network B is either LTE or NR.
   Applicable UE architecture: Single-Rx/Dual-Rx/Single-Tx
UE SIMs may belong to same or different operators.
USIM can be a physical SIM or eSIM.
Coordination with relevant WGs, such as SA2, should be considered where relevant."

Multi-USIM Devices

Figure 2A:
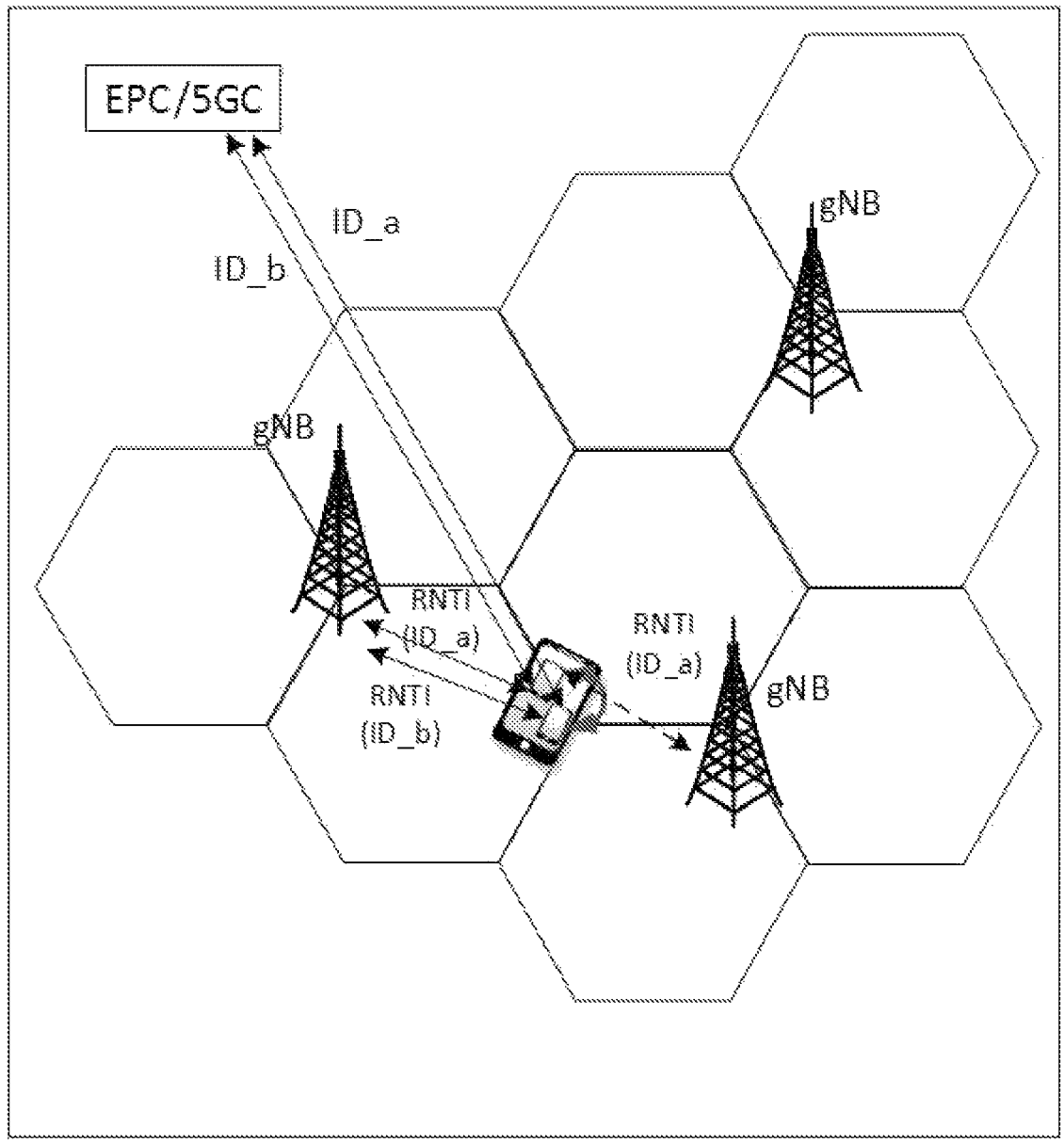
FIG. 2A shows a multi-USIM device with two USIMs belonging to the same MNO.
Figure 2B:
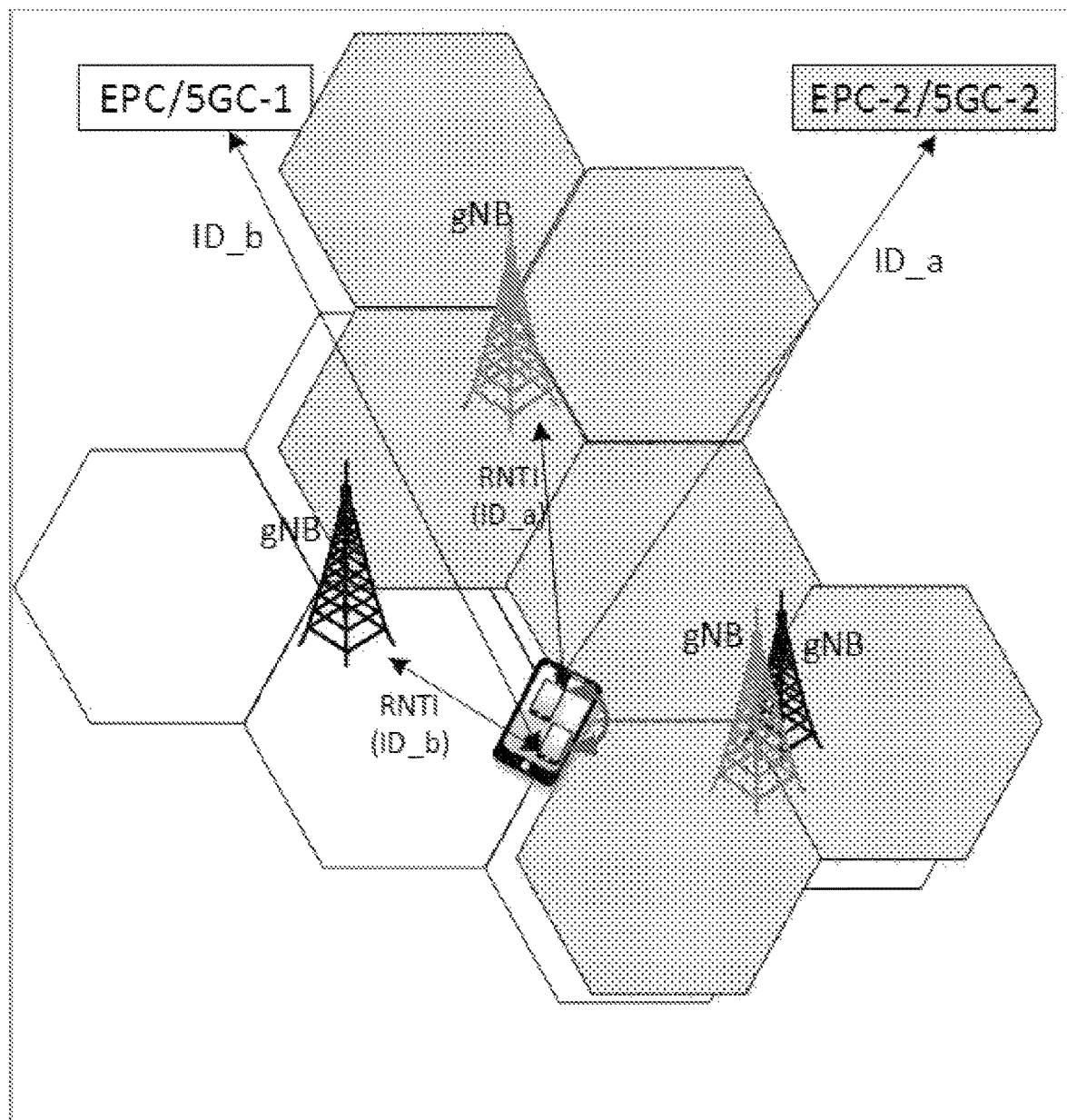
FIG. 2B shows a multi-USIM device with two USIMs belonging to different MNOs.

A multi-USIM device has two (Dual) or more (Multiple) simultaneous 3GPP/3GPP2 network subscriptions with multiple corresponding International Mobile Subscriber Identities (IMSI) at EPS or Subscription Permanent Identifiers (SUPI) at 5GC each associated with a particular USIM belonging to the same or different Mobile Network Operator (MNO) or Mobile Virtual Network Operator (MVNO). A MUSIM device 110-1 connected to one or more gNBs (such as gNB 170-1 and gNB 170-2) with independent subscriptions is shown in FIG. 2A and FIG. 2B. In FIG. 2A, the two USIMs (USIM 202-1 and USIM 202-2 belong to the same MNO/MVNO, are registered with two independent ID's (namely ID_a and ID_b) at the core network 204, and may be using the same cell or two neighbor cells (such as cell 206-1 and cell 206-2) as a serving cell (where this later case can occur if the UE 110-1 is at the edge (such as edge 207) between two or more cells and due to load balancing or the handover procedures one USIM (e.g., USIM 202-1) gets assigned to a cell while the other USIM (e.g., USIM 202-2) gets assigned to another). In addition to cells 206-1 and 206-2, also shown in FIG. 2A are cells 206-3, 206-4, 206-5, 206-6, 206-7, 206-8, and 206-9, as well as gNB 170-3.

In FIG. 2B, the two USIMs (USIM 202-1 and 202-2) belong to different MNOs and may be using two neighboring or co-located cells (such as cell 206-2 and 256-4) from each MNO as a serving cell. MUSIM devices (such as device 110-1) are widely available in the market—especially in the enhanced Mobile Broad Band (eMBB) section. In FIG. 2B, USIM 202-1 belongs to an MNO associated with gNB 170-2, and is registered with ID_a at the core network 204-2 (EPC-2/5GC-2). USIM 202-2 belongs to an MNO associated with gNB 170-1, and is registered with ID_b at the core network 204-1 (EPC-1/5GC-1). In FIG. 2B, cells 256-1, 256-2, 256-3, 256-4, 256-5, and 256-6 are associated with one MNO, while cells 206-5, 206-6, 206-2, 206-9, and 206-8 are associated with another MNO. Also shown in FIG. 2B are gNB 170-3 and gNB 170-4.

Multi-USIM Terminology

Two main types of MUSIM devices are normally referred to depending on the supported simultaneous RRC_states on the USIMs. The first type is Dual SIM Dual Standby (DSDS) or Multi USIM Multi Standby (MUMS). The first type involves MUSIM devices which are registered with two or more independent subscriber IDs (USIMs) and can be in RRC_IDLE mode on all USIMs. However, it can only be on RRC_CONNECTED mode with a single USIM at a given time. The second type is Dual SIM Dual Active (DSDA) or Multi USIM Multi Active (MUMA). The second type involves MUSIM devices which are registered with two or more independent subscriber IDs (USIMs) and can be in RRC_IDLE mode on all USIMs. And the device can maintain RRC_CONNECTED mode activities on all USIMs.

Furthermore, the UE's behavior with respect to the simultaneous handling of multiple USIMs may depend on the UE's capabilities, including SingleRx/SingleTx, DualRx/SingleTx, and DualRx/DualRx. In SingleRx/SingleTx, the UE is only capable of receiving traffic from one network and/or transmitting traffic to one network at a time (capability type 1). In DualRx/SingleTx, the UE is capable of simultaneously receiving traffic from two networks but is capable of transmitting to only one network at a time (capability type 2). In DualRx/DualRx, the UE is capable of simultaneously receiving and/or transmitting to/from two networks (capability type 3). The examples described herein are applicable to DualRx devices, i.e. devices which are capable to run two independent simultaneous receptions.

Paging Reception Mechanism

The Paging Frame (PF) and Paging Occasion (PO) are determined based on the UE_ID, as defined in TS 38.304 in section 7.1:

"The PF and PO for paging are determined by the following formulae:
   SFN for the PF is determined by:
      (SFN+PF_offset) mod T=(T div N)*(UE_ID mod N)
   Index(i_s), indicating the index of the PO is determined by:
      i_s=floor(UE_ID/N) mod Ns
   The following parameters are used for the calculation of PF and i_s above:
      T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).
      N: number of total paging frames in T
      Ns: number of paging occasions for a PF
      PF_offset: offset used for PF determination
      UE_ID: 5G-S-TMSI mod 1024"

The additional elements not defined in the transcribed text are SFN—System Frame Number, and 5G-S-TMSI—it is a 48 bit long bit string (TS 23.501) and assigned by the AMF (Access and Mobility Management Function).

Managing power consumption is a general problem in smartphones and it becomes especially critical in multi-USIM devices where several subscriptions need to be maintained in parallel. When a multi-USIM device has two (or more) subscriptions in RRC_Idle/RRC_Inactive, it may need to perform for each of these subscriptions the following actions: monitor paging occasions, perform measurements, and read the relevant system information. The paging occasions associated with different subscriptions are likely to occur at different times. This is the case, since the timing of the paging occasions is computed based on each subscription's 5G-S-TMSI. Consequently, the UE may have to wake-up at different times to monitor each of these paging occasions, which can lead to a significance increase in power consumption.

Figure 3:
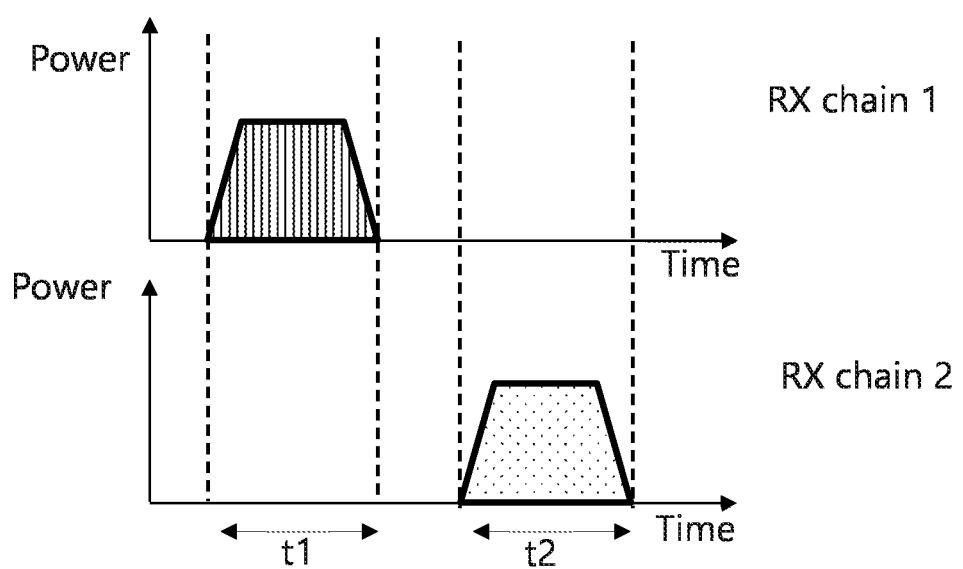
FIG. 3 shows a MUSIM device with at least two RX chains, where RX chains are activated at different times for paging monitoring by each USIM.

Taking as an example a dual RX MUSIM device, where both subscriptions are in RRC_Idle/RRC_Inactive, FIG. 3 illustrates how the device's RX chains (including RX chain 1 and RX chain 2) may be activated at different times due to the paging occasions occurring at different moments. In FIG. 3, RX chain 1 is shown activated at time t1, and RX chain 2 is shown activated at time t2. Alternatively, the same RX chain may be activated twice in order to monitor paging for both USIMs. In any of these cases, the consumed power is increased due to the fact that running two RX chains in parallel (at the exact same time) is more power efficient than running one RX chain at two different times because of the shared resources (e.g., reference oscillator and BB components). In fact, the UE power saving model (TR 38.840) claims that the operation of 2 carriers (equivalent to having two RX chains active) requires 1.7 times more power than a single RX chain, i.e. lower than 2 times which would be the case if the two RX run at different times.

Furthermore, each time an Rx chain needs to become active, it requires ramping-up and ramping-down times which adds to the overall UE power consumption. FIG. 3 illustrates active time for a UE with multiple subscriptions where the associated paging occasions occur at different times, namely time t1 and time t2. The UE in this case may use the same or different RX chains to receive the paging.

Figure 4:
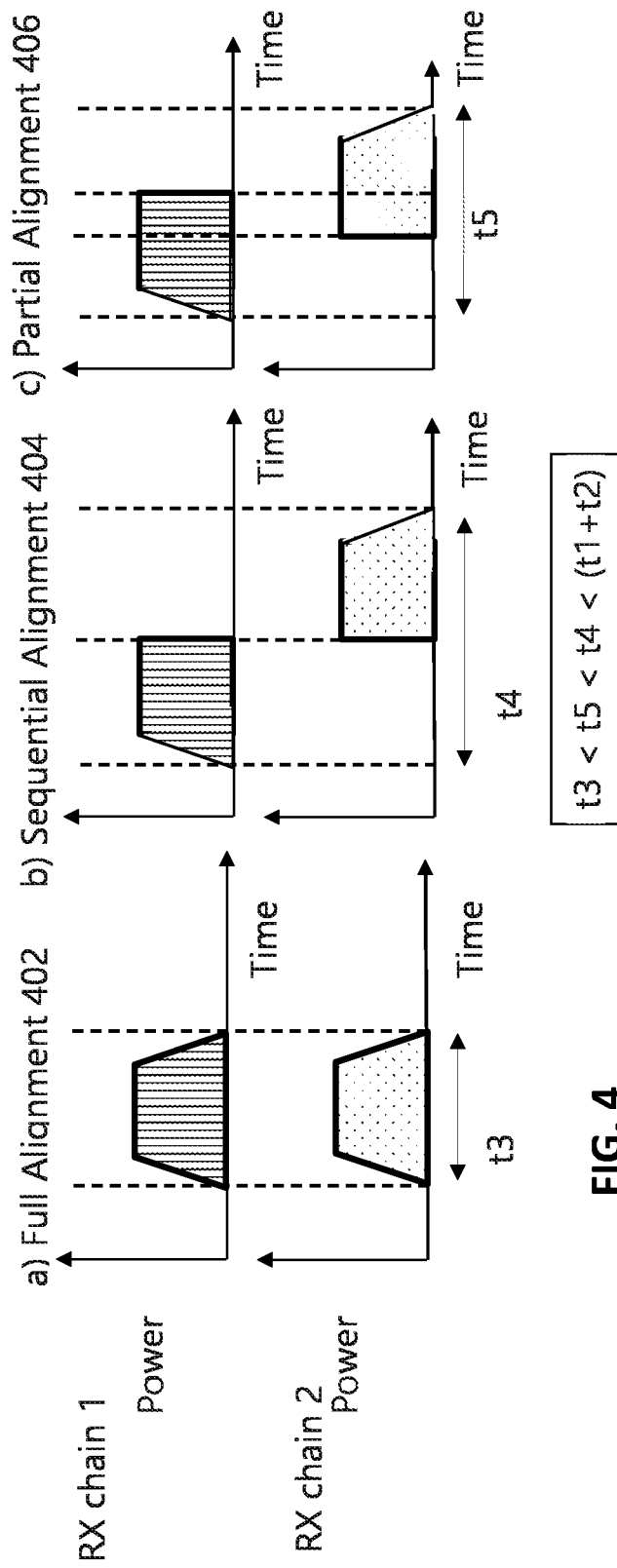
FIG. 4 illustrates a) full alignment of the PO for both USIMs, b) sequential alignment, and c) partial alignment.

The examples herein describe a mechanism that enables the alignment of the POs across multiple USIMs in dual receive devices in order to reduce the device's power consumption as a whole. Specifically, the mechanism can accomplish either of the following PO alignment options: full alignment or sequential/partial alignment. FIG. 4 illustrates a) full alignment 402 of the PO for both USIMs, b) sequential alignment 404, and c) partial alignment 406.

Full alignment 402 is the preferred option. In full alignment, the paging monitoring is forced to be done at the same time (e.g., during time t3), i.e. force PO collision. In this alignment option, the power consumption reduction is due to the HW in the UE being shared when two RX chains are active (e.g., RX chain 1 and RX chain 2), such that the power consumption of having two RX chains in parallel is lower than having two (or the same) Rx chains active at different times. In full alignment, the power ramping-up and ramping-down is only needed once.

Sequential alignment 404 is also depicted in FIG. 4, as is partial alignment 406. In case the UE is not capable of receiving simultaneous paging (e.g., due to lack of two independent HW or if desired PO for full alignment is not available) it can save power if it could use the HW in sequential order and receive the paging right after each other (sequentially) or so the paging for both USIMs are partially overlapping (partial alignment 406). In these alignment options, the power consumption reduction is due to the power ramping-up and ramping-down being only needed once.

As indicated by the example of FIG. 4, the paging monitoring time is such that t3<t5<t4<(t1+t2), where times t1 and t2 are shown in FIG. 3.

The alignment can be accomplished via two different signaling strategies.

In the first strategy (Strategy 1), the UE requests the RAN to provide a new paging occasion (PO). The request may be a direct request for an alternative PO or the request may provide information that may assist the network in assigning an alternative PO. Therefore, whenever the network gets a paging record for that TMSI, it applies it to another PO (the new or alternative PO that the UE has been provided by the network).

In the second strategy (Strategy 2), the UE informs the AMF/gNB that it would like to have another paging offset, and the network/AMF may "re-allocate" 5G-GUTI (based on which the 5G-S-TMSI, the UE paging identity is derived) accordingly.

Novel features of the examples described herein include 1) providing a solution to address the case of dual receive devices in general and especially DSDA devices, where the UE has relatively even higher power consumption due to support of multiple active USIMs and using this capability to save power in some other use cases (since DSDA devices, which are normally dual receive, tend to have especially higher power consumption, the examples described herein are especially applicable to DSDA devices); 2) enforcing PO collisions (or sequential PO) for the USIMs in the same device instead of avoiding them; 3) aligning by asking the network for a new PO, not a new user ID; and 4) providing capabilities for a dual receive device to determine which alignment of paging occasions to request from the network.

Figure 5:
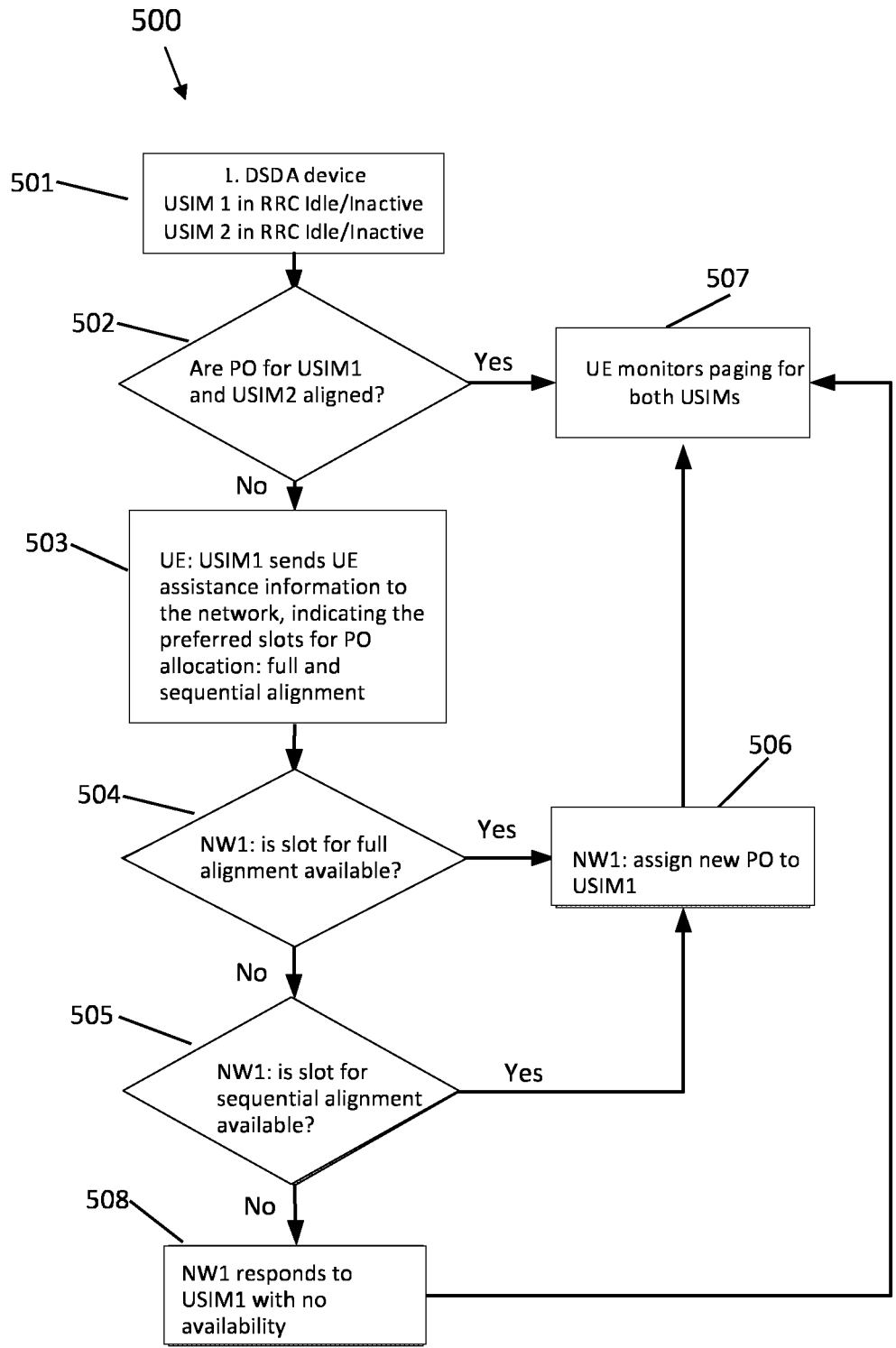
FIG. 5 is an example flowchart of the method described herein for reducing power consumption in dual-receive MUSIM devices.

Some details of the idea are presented in the flowchart 500 of FIG. 5 and described as follows.

At 501, a dual receive device is in RRC_Idle or RRC_inactive with two (or more) USIMs (e.g., USIM1 and USIM2) and needs to monitor for paging reception.

At 502, the device evaluates whether the paging occasions occur simultaneously. For example, the device evaluates whether the PO for USIM1 and USIM2 are aligned. If 'yes', transition to 507. If 'no', transition to step 503.

At 503, the UE sends UE assistance information (see discussion herein related to "Information exchange between UE, gNB, and AMF") to the network corresponding to its USIM1 including the preferred slots for PO allocation, implemented as full and, optionally, sequential alignment as well. This may be done by (a) indicating the slot/slots that the device would like to get assigned; (b) indicating the slot/slots that the device would not like to get assigned; or (c) indicating the current PO assigned to the other USIM in the same UE device.

If the USIM1 uses option (a), i.e. sending the slot/slots that it would like to get assigned, then in case a single slot is proposed to the network, it corresponds to option 1 (full alignment). In case several slots are proposed to the network, it includes a start and end slot, wherein the NW may place the paging. t_start and t_end should be determined based on the approach chosen by the UE.

Figure 6:
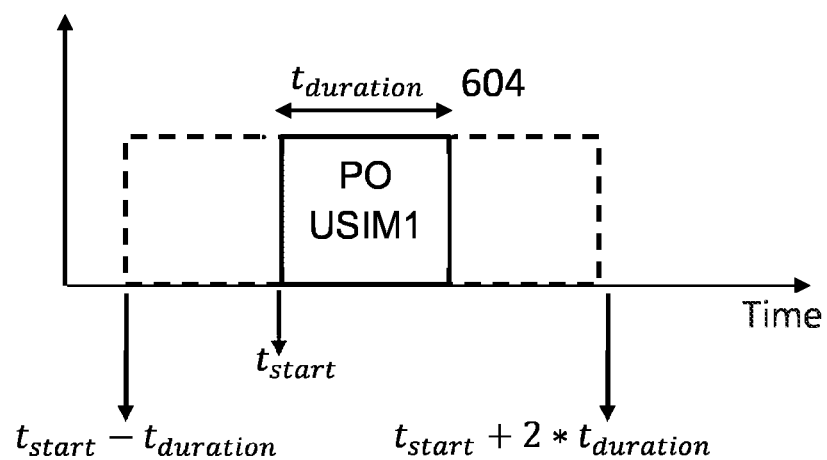
FIG. 6 shows an example range of time where the network can allocate the PO for the at least second USIM.

FIG. 6 shows an example range of time 600 where the network can allocate the PO for the at least second USIM (e.g., USIM2). In FIG. 6, t_start is item 602, and t_duration is item 604. The paging should be allocated between t_start–t_duration and the end point may be t_start+2*t_duration, as depicted in FIG. 6. This provides more flexibility for the NW, at the cost of increased setup time (message-response-message). This option is also more likely to reach an optimal solution. The decision on which option to use might be made by the network depending on the available slots. A user may inform which one is the preferred (most efficient) option that corresponds to full alignment.

If USIM1 uses the option (b), it indicates to the network the range of time in which the paging occasion should not be allocated. This involves the same format as for option (a), such that t_start and t_end may be used.

In case that the USIM1 uses the option (c), sending the current PO assigned to the other USIM (USIM2) in the device to NW1, the network determines which one(s) is/are the desired PO to be assigned to the USIM1 in order to have full or sequential/partial alignment.

At 504, the network checks whether the requested PO for full alignment is available. If 'yes', transition to 506. If 'no', transition to 505.

At 505, the network checks whether the requested PO for sequential alignment is available. If 'yes', transition to 506. If 'no', transition to 508.

Figure 8A:
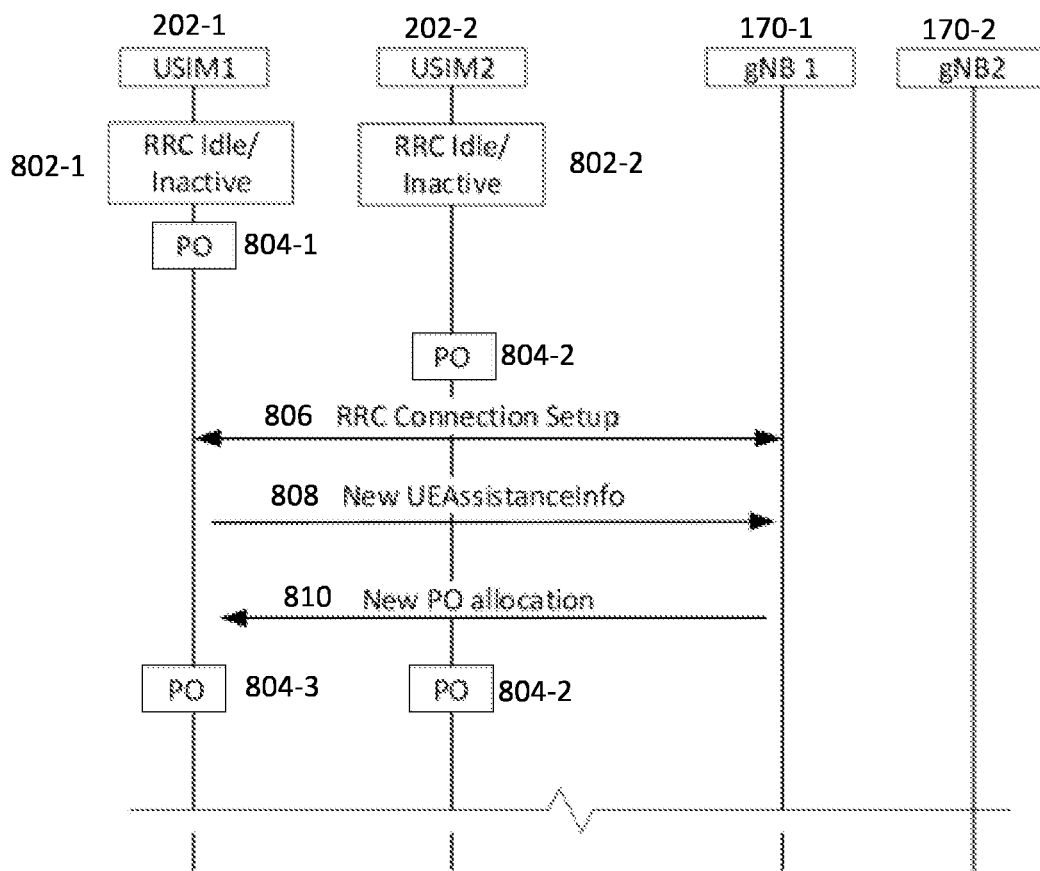
FIG. 8A shows an example signaling exchange between a UE and a gNB where one USIM gets a new PO location from the NW based on the UE's assistance information.

At 506, the network informs the USIM1 about the new assigned PO. An example of the needed signaling exchange is shown in FIG. 8A.

At 507, the UE monitors for paging reception for both USIMs.

At 508, the network (e.g., NW1) informs USIM1 that none of the desired PO are available. Transition to 507, where the UE uses the already assigned PO to monitor for paging.

Figure 8B:
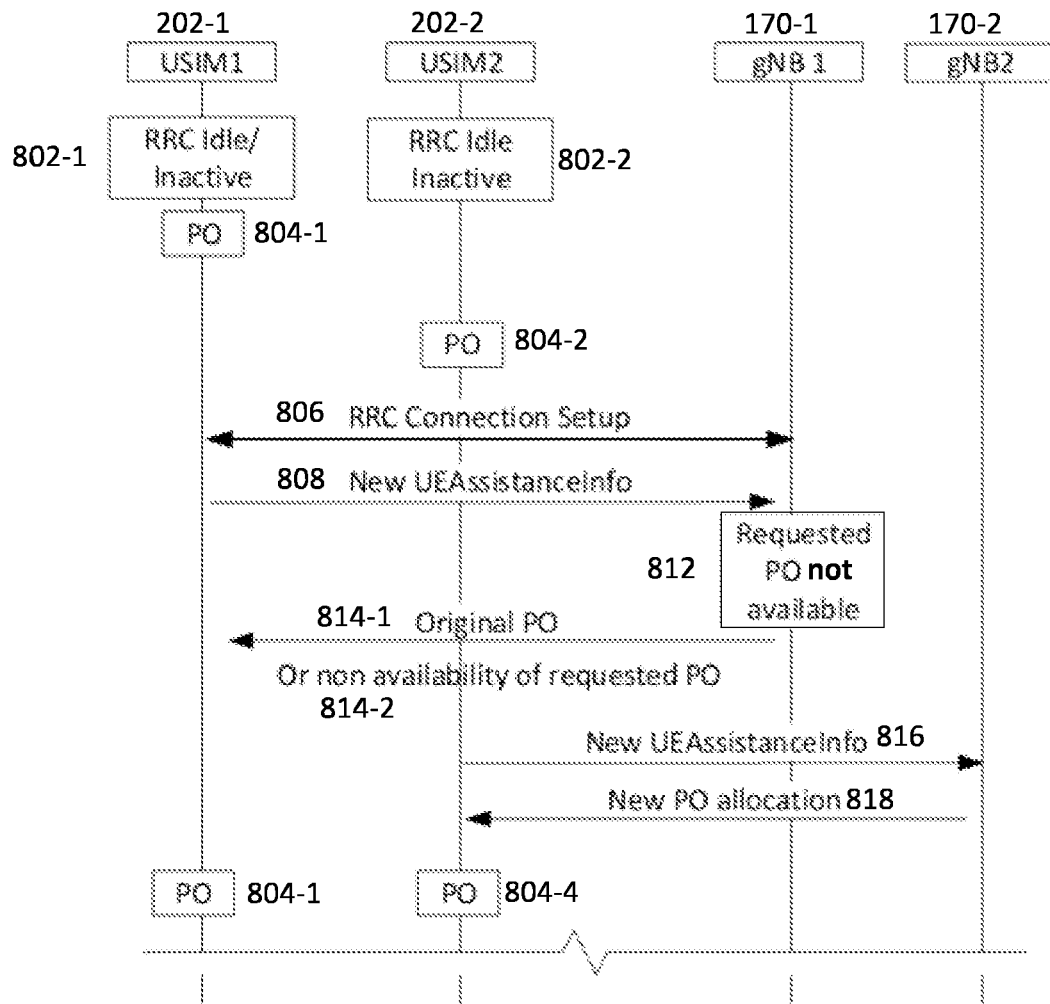
FIG. 8B shows an example signaling exchange between a UE and a gNB where USIM2 gets a new PO from gNB2 after rejection from gNB1 to USIM1.

If USIM1 gets a response from a first public land mobile network (e.g., PLMN1) with "no availability of the requested slots", the device may try to repeat the same process with USIM2 and its network, PLMN2. An example of this process is illustrated in FIG. 8B. If the response is also negative, USIM1 and USIM2 may request the network information about available slots in order to choose a combination of available POs that allow full or, at least, sequential alignment. If the two USIMs are using the same PLMN, one USIM requests such information.

The UE may also decide to prioritize the optimal solution (full alignment) over sequential alignment. In that case, the UE requests a full aligned PO to NW1 and, if the NW1 responds that such PO is not available, the UE requests to NW2 for a full aligned PO. If NW2 also replies that the desired PO is not available, the UE then requests for sequential alignment to NW1. If none of the previous requests are fulfilled, the UE SIM2 asks for sequential alignment to NW2 as a last option. This increases the possibility of reaching an optimal solution at the cost of higher setup time as well as signaling load.

For Strategy 1, a new field may be specified in the RRC message, UEassistanceInformation (or in an alternative RRC message), for the UE to indicate its preferred paging occasion. The NW is to provide a new PO location according to the UE's preference (through direct (SFN and slot indication) or indirect signaling (by a value that the UE can use to calculate the PO)). This can be addressed by a modified paging or by an additional field which would carry an element that refers to the alternative paging identity to be used by the UE in a given cell the paging IE could have. If it is not possible for the NW to satisfy the UE's request it should respond with a "reject/NACK" message.

For Strategy 2, a new field in the signaling exchange for the UE registration to the core network may be specified (via a message sent between the UE and the AMF, potentially with interaction of the gNB). The information would most likely be carried in an information element within the dedicated NAS-Message, which is also carrying elements like the 5G-GUTI, the UE capability and the registration type. The response from the AMF would need to be redesigned such that there is a response for the UE (with indication of the alternative ID to use when connected to the network, or a rejection of the request).

Information Exchange Between UE, gNB and AMF

Table 1 shows UE Assistance Information field descriptions including the added field for the UE's preferred paging occasion. Refer to TS38.331.

TABLE 1

UEAssistanceInformation field descriptions delayBudgetReport
reducedBW-FR1-DL
reducedBW-FR1-UL
reducedBW-FR2-DL
reducedBW-FR2-UL
reducedCCsDL
reducedCCsUL.
reducedMIMO-LayersFR1-DL
reducedMIMO-LayersFR1-UL
reducedMIMO-LayersFR2-DL
reducedMIMO-LayersFR2-UL
type1
preferredPagingOccasion <- New element
Indicates the Paging Occasion for full or sequential alignment,
or the current Paging Occasion allocated to the other USIM
in the device. Values could be given as an absolute time,
as a time offset relative to the current system timing
(based on system frame number), or as a time offset
from the current Paging Occasion.

Table 1 is also shown in FIG. 7 with the added field for the UE's preferred paging occasion highlighted as 702. As indicated in Table 1 and FIG. 7, the new element preferredPagingOccasion indicates the paging occasion for full or sequential alignment, or the current paging occasion allocated to the other USIM in the device. Values could be given as an absolute time, as a time offset relative to the current system timing (based on system frame number), or as a time offset from the current paging occasion.

Within this description, parameter names are merely exemplary in nature. Accordingly, in this description where a specific naming of an information element is provided (e.g., preferredPagingOccasion), other parameter names are possible.

The UE assistance information sent by the UE to the network includes the preferred PO allocations. The UE assistance information message is described in Table 1 and FIG. 7. The novel examples described herein extend it with the paging occasion information for full (and sequential) alignment, as specified in Table 1 (and FIG. 7—item 702).

The gNB may respond to the UE with a new PO allocation or, if the desired PO is not available, it may inform the UE with a non-availability message or assign again the original PO of the UE. A new IE or expansion of an IE is needed to carry such information.

The information from the AMF to the gNB related to paging information would be carried in the IE called "Paging IE", and contains the signaling information (from 3GPP TS 38.413 v. 16.0.0) as depicted in FIG. 8A and FIG. 8B.

FIG. 8A shows an example signaling exchange between a UE and a gNB where one USIM gets a new PO location from the NW based on the UE's assistance information In the example signaling exchange shown by FIG. 8A between a UE and a gNB, USIM1 gets a new PO from gNB1. The example signaling exchange of FIG. 8A is between the UE, associated with USIM1 202-1 and USIM2 202-2, and gNB 1 170-1 where USIM1 202-1 gets a new PO 804-3 from gNB1 170-1. FIG. 8A shows USIM1 202-1 associated with an RRC_idle/inactive state 802-1, and USIM2 202-2 associated with an RRC_idle/inactive state 802-2. Initially USIM1 202-1 is associated with PO 804-1, and USIM2 is associated with PO 804-2. RRC connection setup signaling 806 is exchanged between USIM1 202-1 and gNB 1 170-1. As shown in FIG. 8A, USIM1 202-1 provides new UE assistance information 808 to gNB 1 170-1. Then gNB 1

170-1 provides the new PO allocation 810 to USIM1 202-1, wherein USIM1 202-1 is then associated with new PO 804-3.

FIG. 8B shows an example signaling exchange between a UE and a gNB where USIM2 gets a new PO from gNB2 after rejection from gNB1 to USIM1. In particular, the example signaling exchange of FIG. 8B is between the UE, associated with USIM1 202-1 and USIM2 202-2, and gNB 1 170-1 and gNB2 170-2 where USIM2 202-2 gets a new PO 804-4 from gNB2 170-2 after rejection from gNB1 170-1 to USIM1 202-1. FIG. 8B shows USIM1 202-1 associated with an RRC idle/inactive state 802-1, and USIM2 202-2 associated with an RRC idle/inactive state 802-2. Initially USIM1 202-1 is associated with PO 804-1, and USIM2 is associated with PO 804-2. RRC connection setup signaling 806 is exchanged between USIM1 202-1 and gNB 1 170-1. As shown in FIG. 8A, USIM1 202-1 provides new UE assistance information 808 to gNB 1 170-1. gNB 1 170-1 determines that the requested PO is not available 812. gNB 1 170-1 then provides to USIM1 202-1 an original PO signal 814-1 or a non-availability of requested PO signal 814-2. USIM2 202-2 then provides a new UE assistance information signal 816 to gNB2 170-2. gNB2 170-2 then provides a new PO allocation 818 to USIM2 202-2 such that USIM2 202-2 is associated with new PO 804-4.

Paging

FIG. 9 shows the content (information elements) in a paging message 900 that is sent by the AMF and is used to page a UE in one or several tracking areas, wherein the direction is from the AMF to the gNB (e.g., AMF gNB).

Under the examples described herein, the UE paging identity field in the paging message could be modified or the paging IE could have an additional field which would carry an element that refers to the alternative paging identity to be used by the UE in a given cell.

The AMF would potentially obtain the information on the new paging identity to use through gNB assisted information as described in section 8.14.1 of 3GPP TS 38.413, v. 16.0.0:

"8.14.1 UE Radio Capability Info Indication 8.14.1.1 General

The purpose of the UE Radio Capability Info Indication procedure is to enable the NG-RAN node to provide to the AMF UE radio capability-related information. The procedure uses UE-associated signaling.

Successful Operation"

Figure 10:
FIG. 10 depicts a UE radio capability info indication (FIG. 8.14.1.2-1 of 3GPP TS 38.413, v. 16.0.0).

FIG. 10 is FIG. 8.14.1.2-1 of 3GPP TS 38.413, v. 16.0.0 showing "UE radio capability info indication" as exchanged between a NG-RAN node and an AMF.

The NG-RAN node controlling a UE-associated logical NG connection initiates the procedure by sending a UE RADIO CAPABILITY INFO INDICATION message to the AMF including the UE radio capability information.

The UE RADIO CAPABILITY INFO INDICATION message may also include paging specific UE radio capability information within the UE Radio Capability for Paging IE.

The UE radio capability information received by the AMF shall replace previously stored corresponding UE radio capability information in the AMF for the UE, as described in TS 23.501.

Figure 11A:
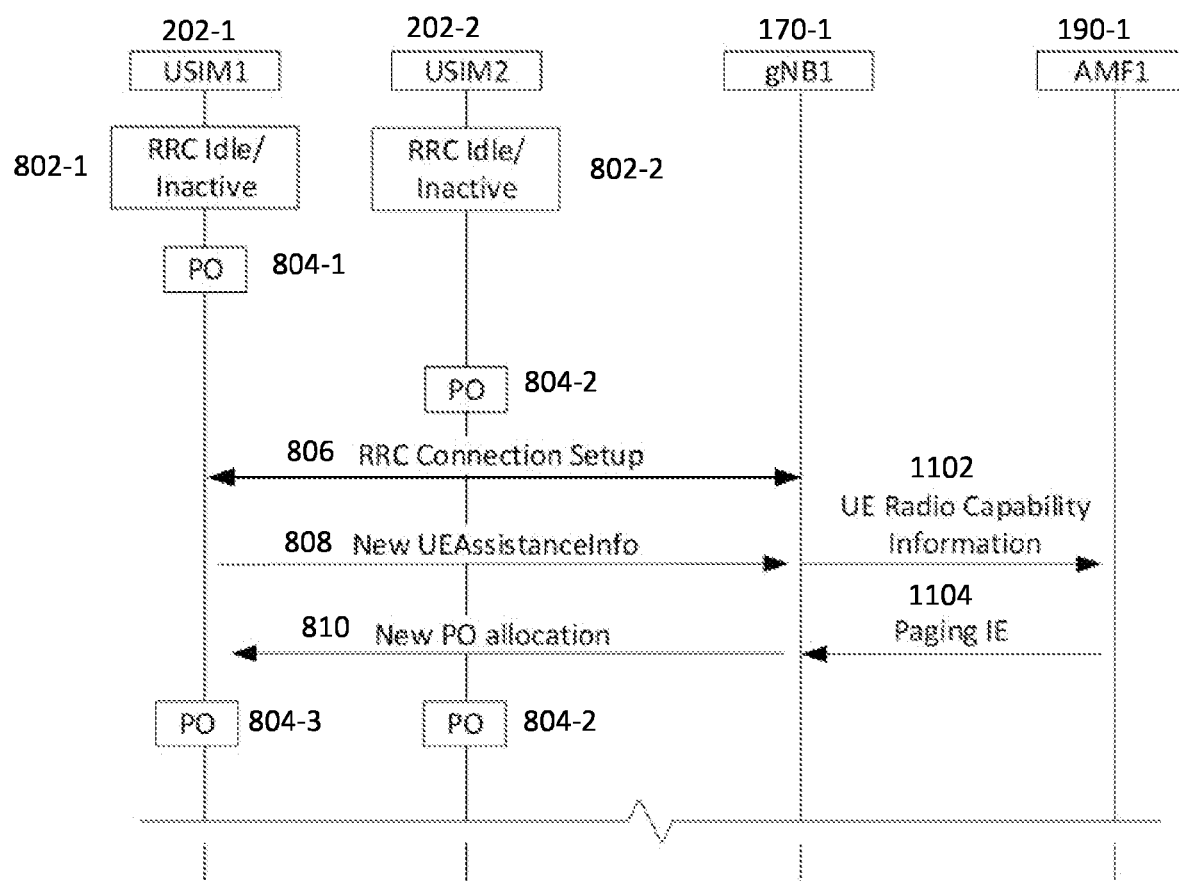
FIG. 11A is an example signaling exchange between a UE and an AMF, where the UE gets a new PO from the AMF, where the PO has a paging IE which contains or carries a new paging ID.

FIG. 11A illustrates the signaling exchange between the UE and AMF, where the gNB acts as relay to provide the assistance information. In particular, FIG. 11A is an example signaling exchange between the UE (associated with USIM1 202-1 and USIM2 202-2) and the AMF 190-1, where the UE gets a new PO 804-3 from the AMF 190-1 via the gNB1 170-1, where the new PO 804-3 has a paging IE 1104 carrying/containing a new paging ID. FIG. 11A shows USIM1 202-1 associated with an RRC idle/inactive state 802-1, and USIM2 202-2 associated with an RRC idle/inactive state 802-2. Initially USIM1 202-1 is associated with PO 804-1, and USIM2 202-2 is associated with PO 804-2. RRC connection setup signaling 806 is exchanged between USIM1 202-1 and gNB 1 170-1. As shown in FIG. 11A, USIM1 202-1 provides new UE assistance information 808 to gNB 1 170-1. Then gNB 1 170-1 provides a UE radio capability information signal 1102 to the AMF 190-1. The AMF 190-1 provides a paging IE signal 1104 to the gNB 1 170-1. The gNB 1 170-1 provides the new PO allocation 810 to USIM1 202-1, wherein USIM1 202-1 is then associated with new PO 804-3.

Figure 11B:
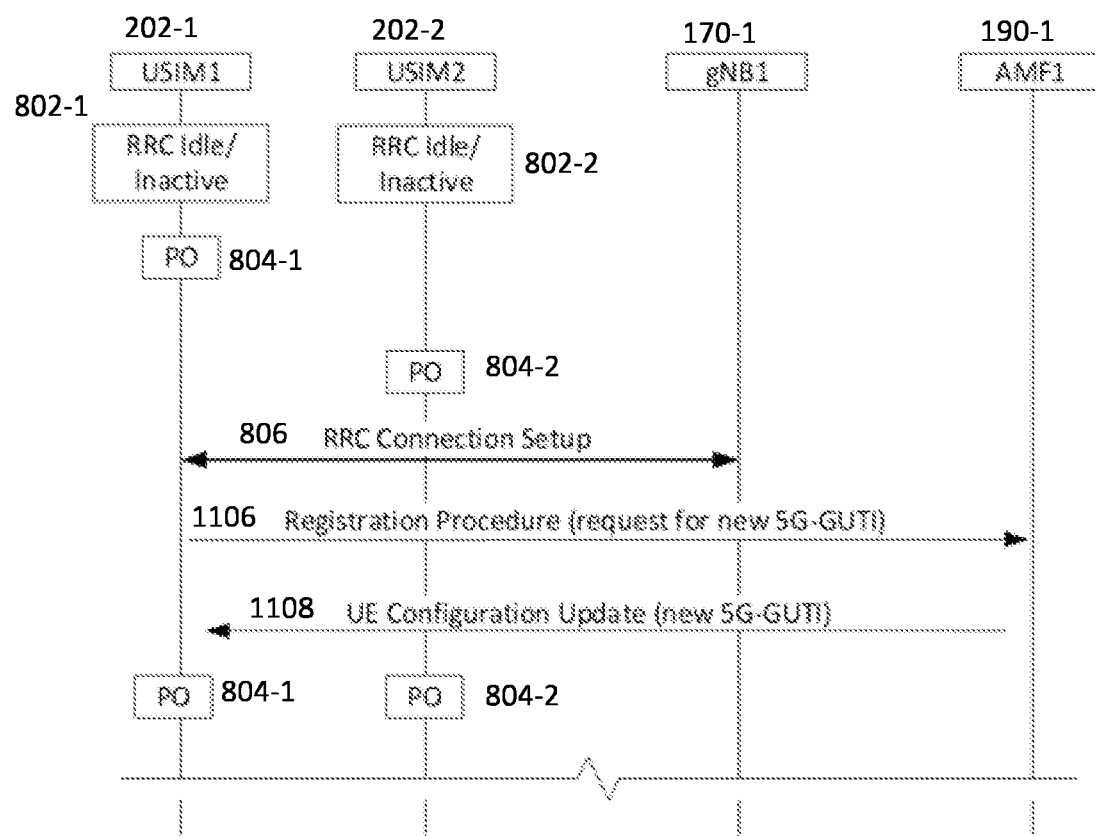
FIG. 11B is an example signaling exchange between a UE and an AMF, where a UE gets a new ID from the AMF using NAS signaling.

The approach of requesting an alternative identity could in principle also be applied on the non-access stratum layer, as shown FIG. 11B, (but would be slightly less associated to the radio access network) and would involve 3GPP TS 24.501 (which would need expansion to cover request/response messages in a similar way as is available for procedures defined in 38.413). The relevant section of 24.501 would be section 9.10.3.3.

As shown in FIG. 11B, the UE may request for a new 5G-GUTI to be allocated as part of registration procedure 1106. Upon receipt of the UE request, the AMF 190-1 uses a UE configuration update procedure to assign new 5G-GUTI 1108. The TMSI which is part of 5G-GUTI needs to be determined in such a way that the UE requested PO (i.e. alternate PO) can be derived.

The technical effects and advantages of the examples described herein include the reduction in the power consumption for dual receive multi USIM devices. Since the paging monitoring requires the UE to wake up very often to check, enabling full alignment or sequential alignment of the PO results in a significant improvement.

Figure 12:
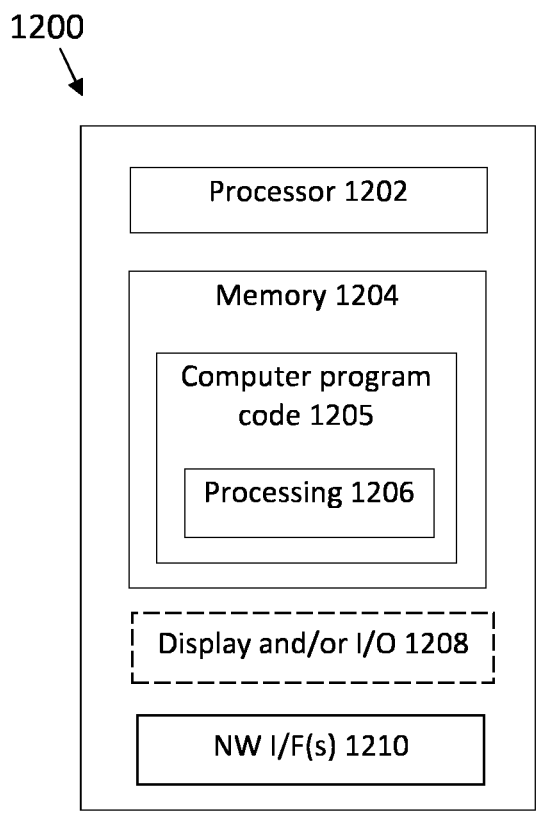
FIG. 12 is an example apparatus, which may be implemented in hardware, configured to implement reducing power consumption in dual receive capable MUSIM devices, based on the examples described herein.

FIG. 12 is an example apparatus 1200, which may be implemented in hardware, configured to implement the examples described herein. The apparatus 1200 comprises a processor 1202, at least one non-transitory memory 1204 including computer program code 1205, wherein the at least one memory 1204 and the computer program code 1205 are configured to, with the at least one processor 1202, cause the apparatus 1200 to implement signaling, a process, a component, a module, and/or a function (collectively 1206) to implement the examples described herein. The apparatus 1200 optionally includes a display and/or I/O interface 1208 that may be used to display aspects or a status of the signaling, process, component, module, or function (e.g., as is being performed or at a subsequent time). The apparatus 1200 includes one or more network (NW) interfaces (I/F(s)) 1210. The NW I/F(s) 1210 may be wired and/or wireless and communicate over the Internet/other network(s) via any communication technique. The NW I/F(s) 1210 may comprise one or more transmitters and one or more receivers.

The apparatus 1200 may be UE 110, RAN node 170, or Network Element(s) 190. Thus, processor 1202 may correspond to processor(s) 120, processor(s) 152, or processor(s) 175, memory 1204 may correspond to memory(ies) 125, memory(ies) 155, or memory(ies) 171, computer program code 1205 may correspond to computer program code 123, module 140-1, module 140-2, subscription 1 192, subscription 2 194, or subscription N 196, computer program code 153, module 150-1, module 150-2, or computer program code 173, and NW I/F(s) 1210 may correspond to N/W I/F(s) 161 or N/W I/F(s) 180. Alternatively, apparatus 1200 may not correspond to either of UE 110, RAN node 170, or Network element(s) 190 (for example, apparatus 1200 may be a remote or a cloud apparatus).

Figure 13:
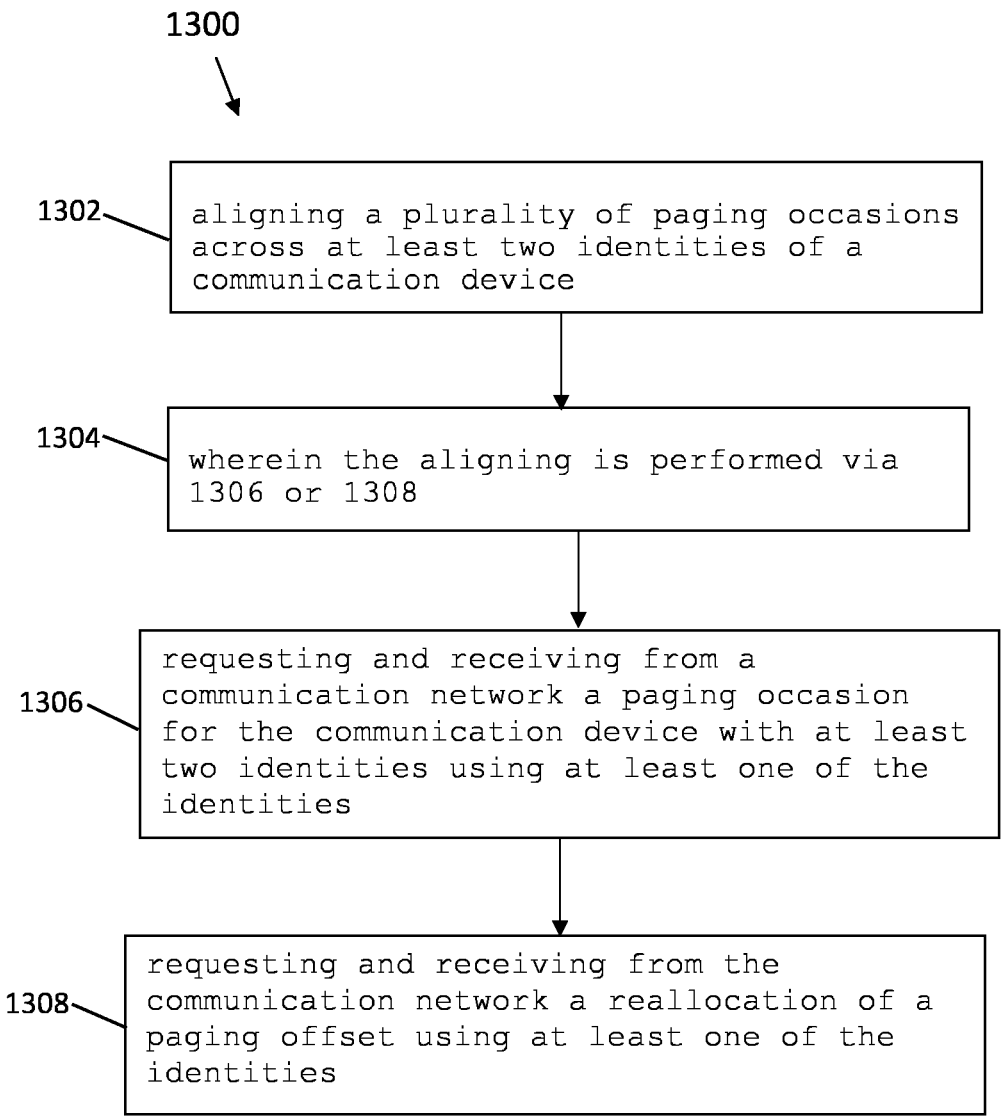
FIG. 13 shows an example method for reducing power consumption in dual receive capable MUSIM devices, based on the examples described herein.

FIG. 13 is an example method 1300 implementing MUSIM UE behavior based on the example embodiments described herein. At 1302, the method includes aligning a plurality of paging occasions across at least two identities of a communication device. At 1304, the method includes wherein the aligning is performed via items 1306 or 1308. At 1306, the method includes requesting and receiving from a communication network a paging occasion for the communication device with at least two identities using at least one of the identities. At 1308, the method includes requesting and receiving from the communication network a reallocation of a paging offset using at least one of the identities. The method 1300 may be performed by a user equipment, such as UE 110 of FIG. 1 having multiple identities/subscriptions, or a MUSIM device.

Figure 14:
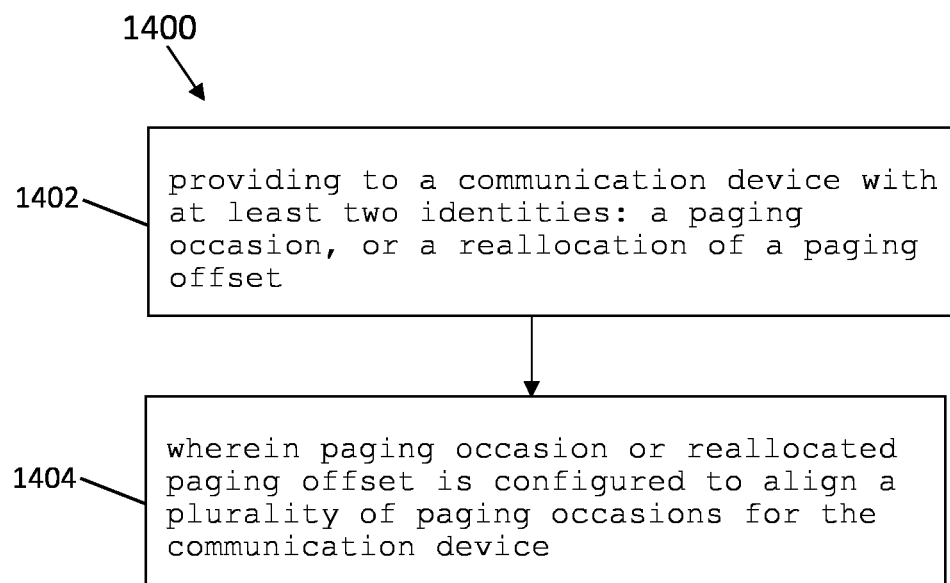
FIG. 14 shows another example method for reducing power consumption in dual receive capable MUSIM devices, based on the examples described herein.

FIG. 14 is another example method 1400 implementing NW behavior, based on the example embodiments described herein. At 1402, the method includes providing to a communication device with at least two identities: a paging occasion, or a reallocation of a paging offset. At 1404, the method includes wherein the paging occasion or reallocated paging offset is configured to align a plurality of paging occasions for the communication device. The method 1400 may be performed by a radio node, such as the RAN node 170 of FIG. 1.

Figure 15:
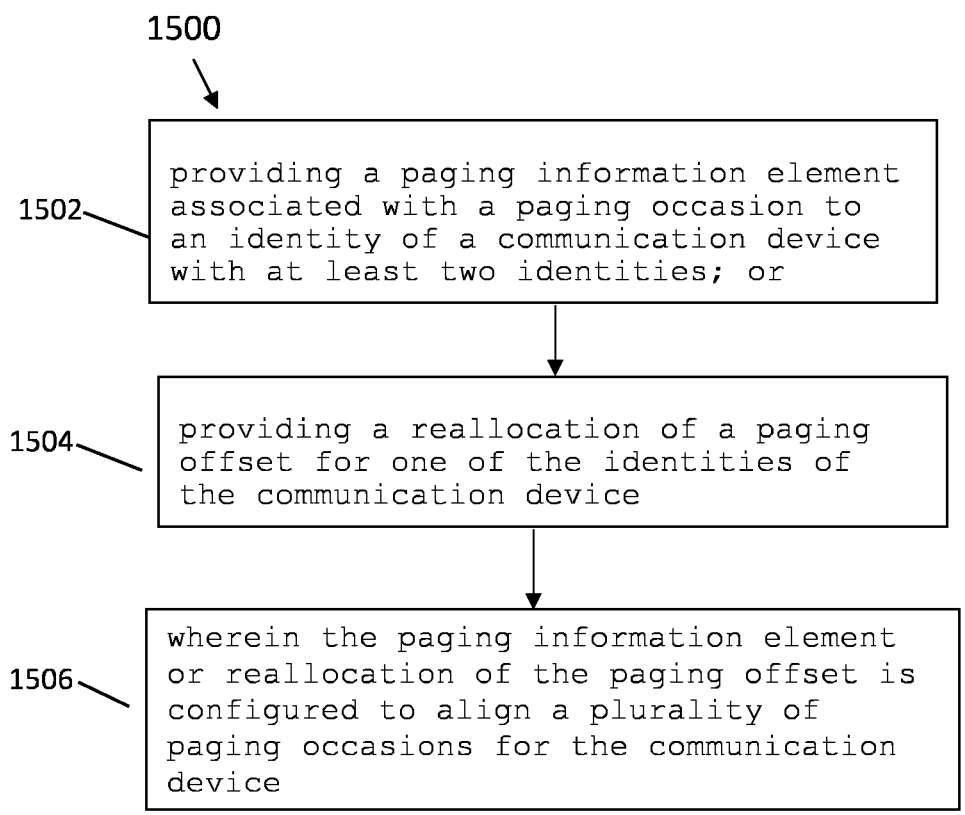
FIG. 15 shows another example method for reducing power consumption in dual receive capable MUSIM devices, based on the examples described herein.

FIG. 15 is another example method 1500 implementing NW behavior, based on the example embodiments described herein. At 1502, the method includes providing a paging information element associated with a paging occasion to an identity of a communication device with at least two identities. At 1504, the method includes providing a reallocation of a paging offset for one of the identities of the communication device. Items 1502 and 1504 are alternatives. At 1506, the method includes wherein the paging information element or reallocation of the paging offset is configured to align a plurality of paging occasions for the communication device. The method 1500 may be performed by AMF functionality of a network element, such as the network element 190 of FIG. 1.

Throughout this description, reference numbers 110-"x", 170-"x", and 190-"x" correspond to the actual items or variations of the items of FIG. 1, including UE 110, RAN node 170, and Network Element(s) 190. As an example, MUSIM device 110-1 of FIG. 2A and FIG. 2B may be or implement functionality of the UE 110 of FIG. 1, AMF 190-1 of FIG. 11A and FIG. 11B may be or implement functionality of the Network Element(s) 190 of FIG. 1, etc.

Figure 16:
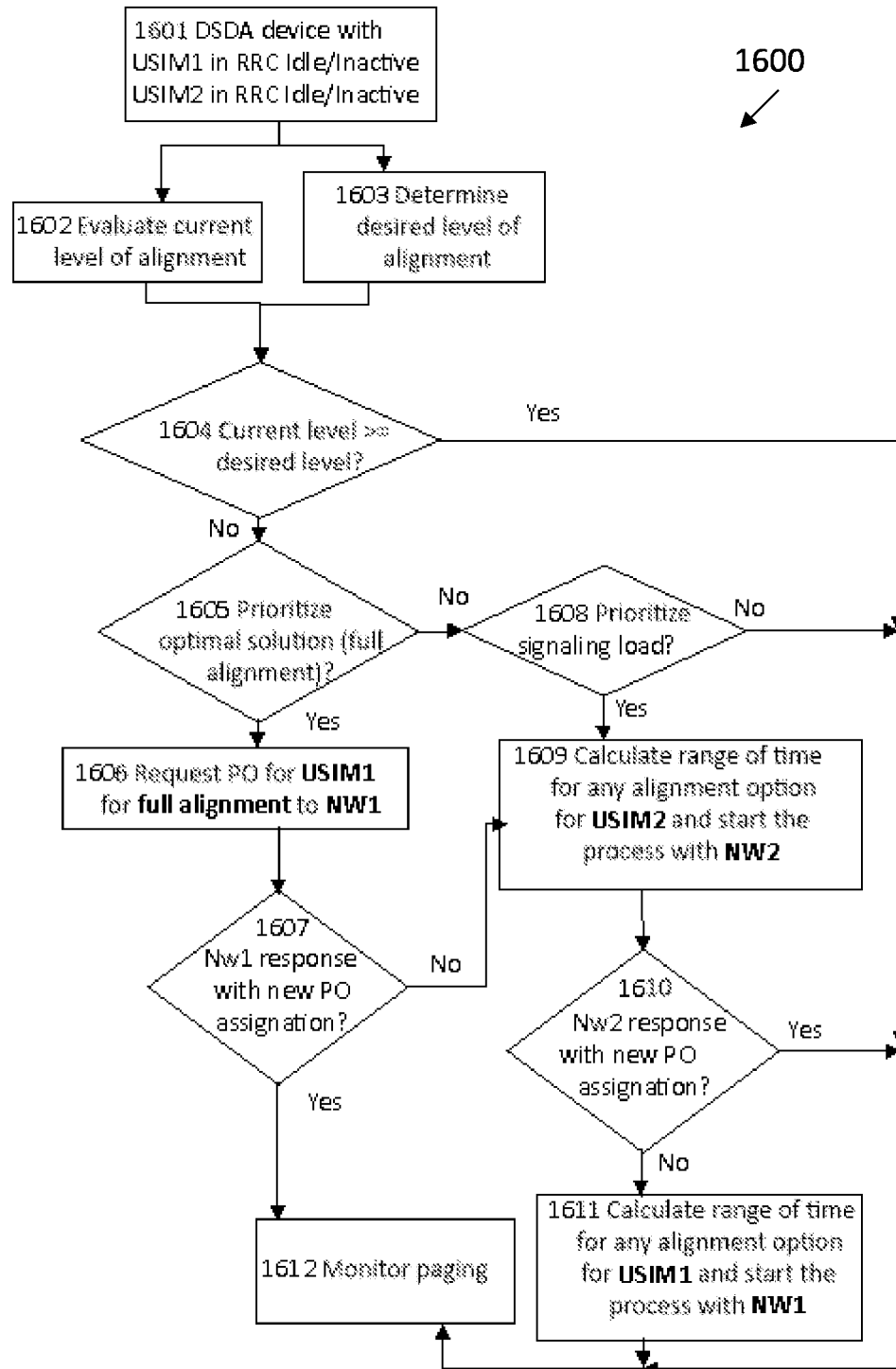
FIG. 16 is an example flowchart of the method described herein for reducing power consumption in dual-receive MUSIM devices.

Some details of the idea are presented in the flowchart 1600 of FIG. 16 and described as follows. The details described with FIG. 16 particularly support providing capabilities for a dual receive device to determine which alignment of paging occasions to request from the network. The steps of the flow chart 1600 may be performed by a user equipment, such as UE 110 of FIG. 1 having multiple identities/subscriptions, or a MUSIM device. It should be noted that the idea in FIG. 16 is presented by referring to paging occasions in accordance with step 1306. However, the steps may be followed also, when alignment is performed in accordance with step 1308, whereby steps referring to requesting paging occasions refer to requesting reallocation of a paging offset. Therefore, the information exchange between UE, gNB, and AMF presented above may be followed for implementation of the steps of FIG. 16.

At 1601, a dual receive device is in RRC_Idle or RRC_inactive with two (or more) USIMs (e.g., USIM1 and USIM2) and needs to monitor for paging reception.

At 1602, 1603 and 1604, the device evaluates alignment of paging occasions assigned to identities of the device. Accordingly, the alignment of the paging occasions of the two or more USIMs are evaluated with respect to each other.

At 1602 the device may determine a current level of alignment of the paging occasions. In an example the current level of alignment may be an alignment described with FIG. 4. Accordingly, the device may determine that the current level of alignment of the paging occasions is one of a full alignment 402 of the POs for the USIMs, b) sequential alignment 404, and c) a partial alignment 406. In example the current level of alignment may be determined on the basis of information of paging occasions of the identities of the device, e.g., POs of USIM1 and USIM2. Then the alignments described with FIG. 4 may be determined as follows, where t_startX is the time when PO for USIMX starts and t_duration is the length of the PO:

Full alignment: if t_start1=t_start2.

Partial alignment: if t_start2<t_start1+t_duration or t_start2>t_start1−t_duration.

Sequential alignment: if t_start2=t_start1+t_duration or t_start2=t_start1−t_duration.

At 1603 the device may determine a target level of alignment of the paging occasions. The target level of alignment of the paging occasions may also be referred to as a desired level of alignment of the paging occasions. In an example in accordance with at least some embodiments at 1603, the target level of alignment may be determined on the basis of at least one of capabilities (Rx/Tx) of the device, mobility of the device and/or a power consumption of the device. Examples of the mobility of the device comprise a current state of mobility and a history of mobility of the device. Examples of the capabilities of the device comprise a number of Rx/Tx of the device. The mobility type may be determined on the basis of evaluating the mobility of the device.

In an example, at 1603, the target level of alignment may be a minimum level of alignment accepted by the device. The minimum alignment may be any of the alignments described with FIG. 4, e.g., a full alignment or a partial/sequential alignment. The minimum alignment may be determined on the basis of priorities of the device:

1. Priority is to reach an optimal alignment, e.g., a full alignment, which may increase the signaling exchange between the device and the network.
2. Priority is to minimize a signaling load associated with requesting and assigning paging occasions and to accept a partial/sequential alignment if the full alignment is not possible. In this case the device tries to reach any of the alignment options described with FIG. 4 for one of the PLMNs before initiating the process with another PLMN.

Figure 23:
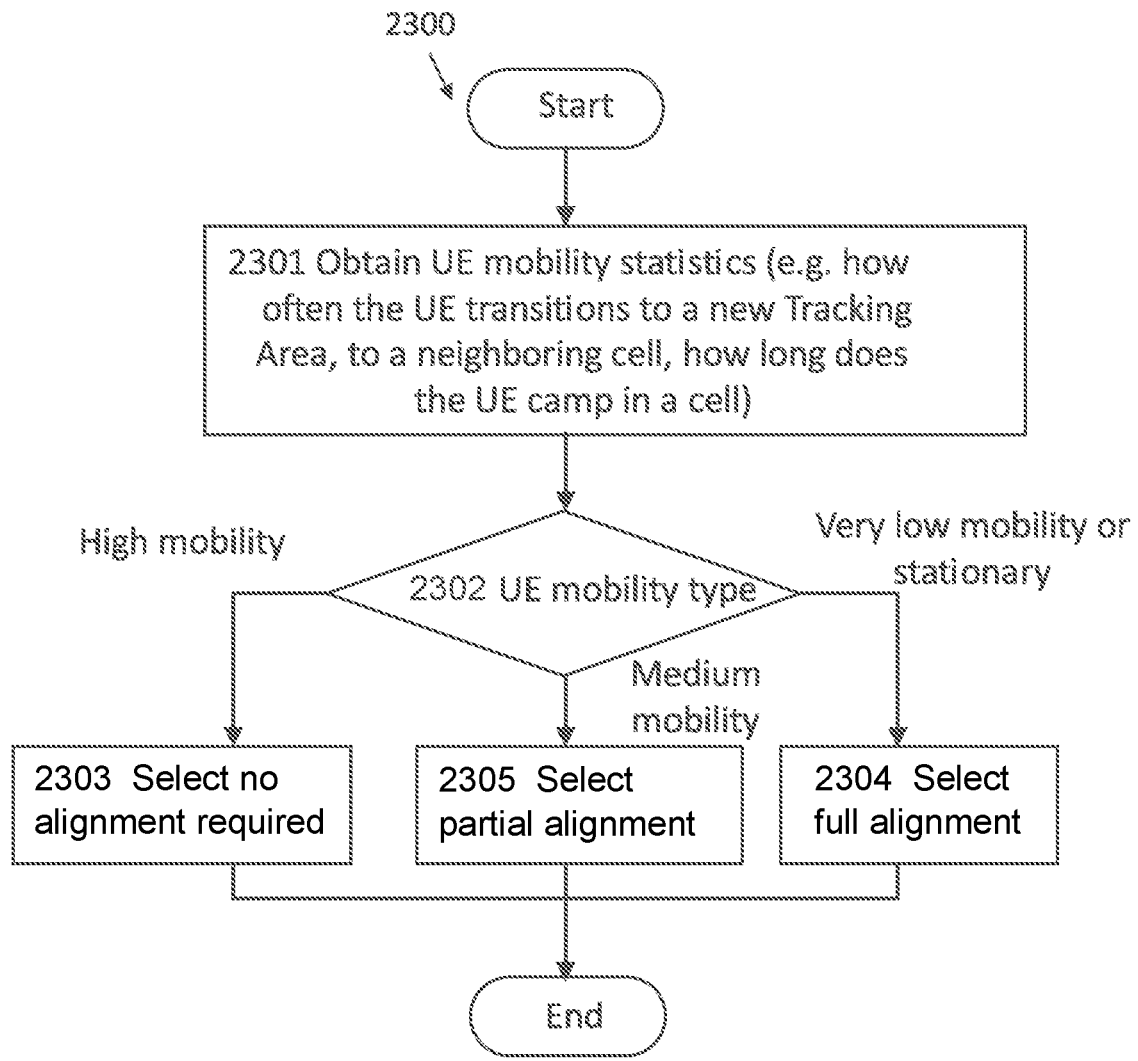
FIG. 23 shows another example method for reducing power consumption in dual receive capable MUSIM devices, based on the examples described herein.

It should be noted that the device may use mobility information about a current state of mobility and a history of mobility of the device for determining which of the priorities, e.g., 1 or 2 above, is used for determining the target level of alignment. The mobility type of the device may be, e.g., High mobility user, Medium mobility user, Low mobility user or stationary user. FIG. 23 may be referred for details of utilizing mobility information for determining the target level of alignment.

High mobility users may be devices that need or are likely to setup a new PO very often. One reason for this is that a device makes handovers to new serving cells quite often.

Then, it may not be very efficient to pursue the full alignment or even any alignment at all, in which case the device may choose to not make an attempt to align the paging occasions for different identities, i.e. USIMs.

Medium mobility users may be devices, which may be changing serving cells and therefore getting a new PO with a relatively medium frequency. These devices may prefer the alignment option that minimizes the signaling exchange, e.g., prioritizes the signaling load. This is a tradeoff between the benefits from alignment and the effort (signaling) spent to get it, since the process will need to be repeated every time the user is handed over to a new serving cell.

Low mobility or stationary users may be devices that are likely remain in the same cell or a set of cells a large fraction of an observation time period. For low mobility or stationary users the full alignment should be the preferred since once the POs are aligned, the benefits to power consumption of the device are obtained for a long time.

At 1604 the device may evaluate an alignment of the paging occasions on the basis of the current level of alignment determined at 1062 and the target level of alignment determined at 1603. In an example in accordance with at least some embodiments, at 1604, the device may determine if the current level of alignment is higher or equal to the desired level of alignment. It should be noted that a full alignment is considered higher than partial/sequential alignment. The current level of alignment and the target level of alignment may be both one of the alignments described with FIG. 4 for facilitating the evaluation. If the alignment is sufficient, the method may transition to 1612. If the alignment is not sufficient the method may transition to step 1605.

At 1605, the device may determine whether to prioritize at least one alignment of the paging occasions over one or more further alignments of paging occasions. In an example, the device may decide on whether to prioritize the optimal solution, full alignment, over sequential alignment or a partial alignment. In an example at 1605 the device may determine to prioritize a full alignment on the basis of a minimum alignment requirement that is set to indicate the full alignment. If 'yes', transition to 1606. If 'no', transition to step 1608.

At 1606, the device may request a paging occasion in accordance with the prioritized alignment from the communication network using at least one of the identities, e.g., USIM1. In an example, the device may prioritize the full alignment and the device may determine assistance information for requesting a paging occasion using one of the identities. In an example, the device may determine assistance information for requesting a paging occasion for USIM1 on the basis of a current paging occasion assigned to USIM2. The assistance information may indicate that the USIM1 is assigned a paging occasion at the same time with USIM2. In this way the device may attempt to achieve the full alignment between paging occasions.

At 1607, the response received from the network may be checked for determining whether to transition to step 1609 or 1612. In accordance with at least some embodiments, at 1607, in response to the response from the communication network indicates that the paging occasion requested at 1606 has been assigned, transition to 1612. In response to the response from the communication network indicates that the paging occasion requested at 1606 has not been assigned, transition to 1609. It should be noted that in connection with transition to 1612, the device may align the paging occasions across the identities of the device based on the paging occasion assigned by the network for one of the identities, e.g., USIM1.

At 1609, the device may request a paging occasion from the communication network. In an example, in accordance with at least some embodiments, at 1609, the device may request a paging occasion from the communication network using another identity than used previously, e.g., at step 1606. Using another identity provides the device utilizing the response received from the network to the previous request at 1606. For example, when the prioritized alignment requested at 1606 for USIM1 has not been assigned based on the response from the network, at 1609 the paging occasion is requested for USIM2. In an example, at 1609, the device may calculate a range of time for full or partial/sequential alignment and send a request including information indicating the calculated range of time to the network for obtaining a paging occasion for USIM2.

Calculation of a Range of Time

Figure 25:
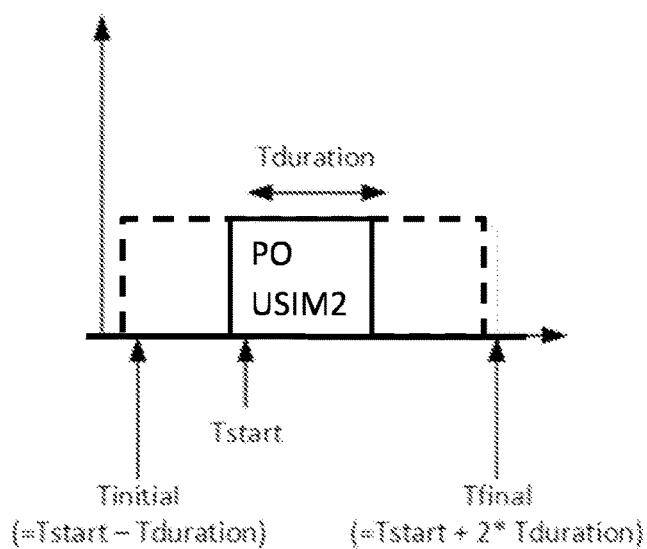
FIG. 25 illustrates a range of time for reducing power consumption in dual receive capable MUSIM devices, based on the examples described herein.

In an example of calculation of a range of time, the device may provide a range of time to the network for achieving an alignment, e.g., any of the alignments described with FIG. 4. For achieving a sequential or partially overlapped paging occasions, the range of time may be calculated on the basis of the following elements described with reference to the item in FIG. 25.

1. An initial time, Tstart that the device desires for the new Paging Occasion from PLMN1. The initial time should match the initial time associated with the Paging Occasion from PLMN2;
2. An acceptable starting time, for the Paging Occasion from PLMN1. To ensure that the POs are either sequentially aligned or at least partially overlap, then the acceptable starting time may be located before or after a starting time of the paging occasion from PLMN2. An acceptable starting time for the paging occasion of PLMN1 may be determined on the basis of a total duration, Tduration, of the Paging Occasion from PLMN2 and a starting time of the paging occasion from PLMN2. Then, the acceptable starting time for the paging occasion from PLMN1 may be from Tduration before the starting time for the Paging Occasion from PLMN2 and to Tduration after the starting time for the Paging Occasion from PLMN2. It should be noted that a partial alignment may be provided, when the starting time for the paging occasion of PLMN1 is less than Tduration from, before or after, the starting time for the Paging Occasion from PLMN2 and sequential alignment is provided, when the starting time for the paging occasion of PLMN1 is equal to Tduration from, before or after, the starting time for the Paging Occasion from PLMN2.

At 1610, the device may check a response from the communication network to the request at 1609. In accordance with at least some embodiments, at 1610, in response to the response from the communication network indicating that the paging occasion requested at 1609 has been assigned, the method proceeds to 1612. On the other hand, at 1610, in response to the response from the communication network indicating that the paging occasion requested at 1609 has not been assigned, the method proceeds to 1611.

At 1611, the device may request a paging occasion from the communication network in accordance with at least one further alignment of paging occasions. The paging occasion may be requested using another identity than previously at step 1610. It should be noted that at 1611, the device may have information that a prioritized alignment, e.g., a full alignment for the other identity, e.g., USIM1, has not been assigned based on the request at 1606. In an example in accordance at least some embodiments, at 1611, the device may request the paging occasion using an identity used for requesting the paging occasion in accordance with a prioritized alignment at 1606. In an example, similar to at 1609, at 1611, the device may calculate a range of time for full or partial/sequential alignment and send a request including information indicating the calculated range of time to the network for obtaining a paging occasion for USIM1. The device may receive a response from the communication network and align the paging occasions across the identities of the device based on the paging occasion assigned by the network for one of the identities, e.g., USIM1, and the device may transition to 1612.

At 1608, the device may determine whether to determine at least one alignment for paging occasions for prioritizing signaling load. If "yes", transition to 1609, if "no" transition to 1612.

In an example, in accordance with at least some embodiments, at 1609, the device may determine at least one alignment for paging occasions for prioritizing signaling load and request, using at least one of the identities, a paging occasion from the communication network in accordance with the determined at least one alignment for prioritizing signaling load for the at least one of the identities. In an example, the device may calculate a range of time for full or partial/sequential alignment and send a request including information indicating the calculated range of time to the network for obtaining a paging occasion for USIM2. The range of time may be calculated as described above in under "Calculation of a range of time".

In an example, in accordance with at least some embodiments, at 1611, in response to receiving from the communication network information indicating that the requested paging occasion, at 1609, in accordance with the determined at least one alignment for paging occasions for prioritizing signaling load for the at least one of the identities is not assigned to the device, the device may determine at least one alignment for prioritizing signaling load for paging occasions for another identity of the identities, and request, using the another identity, a paging occasion from the communication network in accordance with the determined at least one alignment for prioritizing signaling load for paging occasions for said another identity.

At 1612, the device may monitor paging reception of at least two identities based on paging occasions of the identities that have been aligned on the basis of based on the paging occasion assigned by the network for one of the identities, e.g., USIM1 or USIM2.

Figure 17:
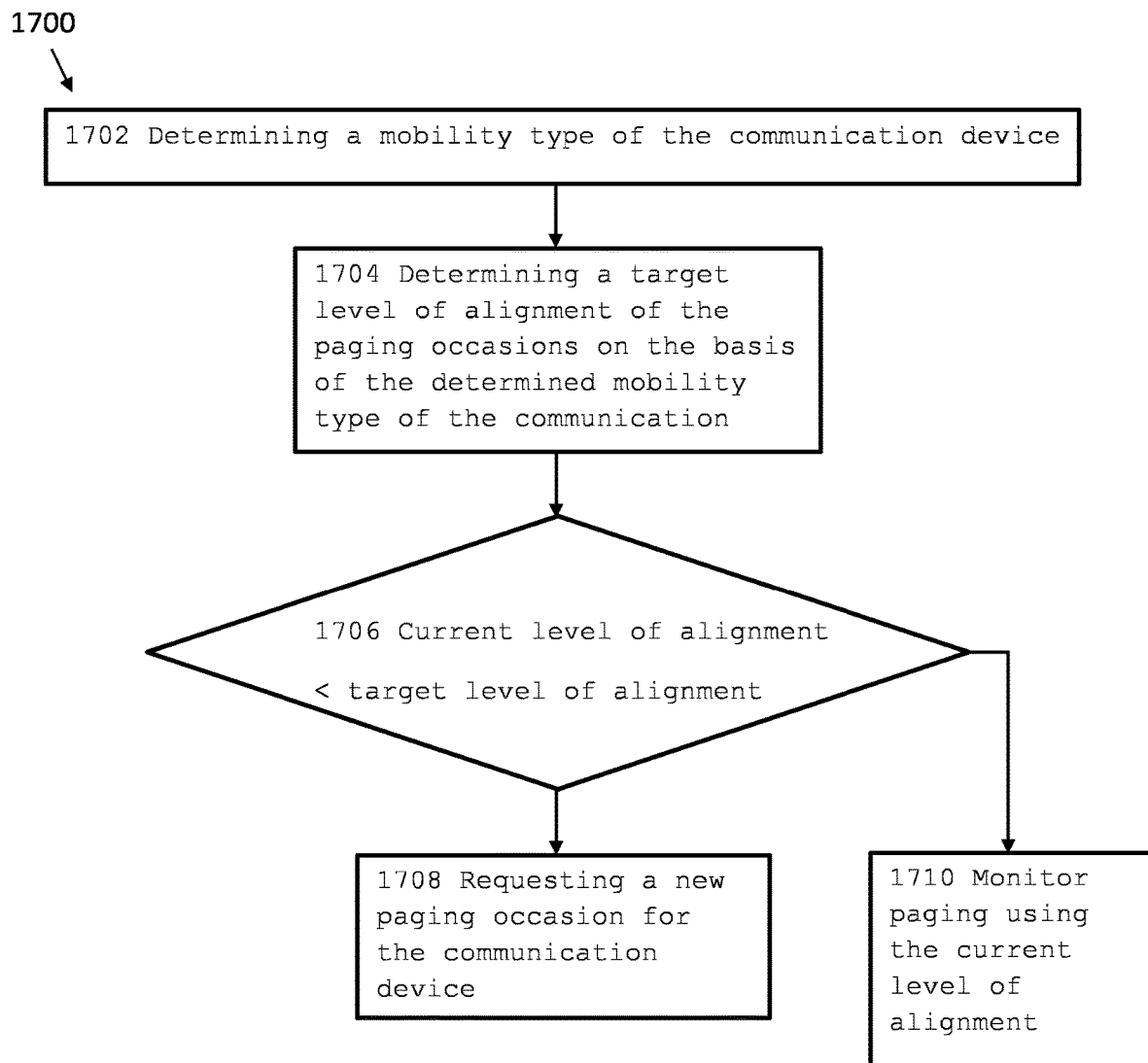
FIG. 17 shows another example method for reducing power consumption in dual receive capable MUSIM devices, based on the examples described herein.

FIG. 17 shows another example method 1700 for reducing power consumption in dual receive capable MUSIM devices, based on the examples described herein. At 1702, the method includes determining a mobility type of the communication device. At 1704, the method includes determining a target level of alignment of the paging occasions on the basis of the determined mobility type of the communication device. At 1706, the method includes determining if a current level of alignment fails to meet the target level of alignment. At 1708, if the current level of alignment fails to meet the target level of alignment, the method includes requesting a new paging occasion for the communication device. At 1710, if a current level of alignment meets the target level of alignment, the method includes monitoring paging reception of at least two identities based on paging occasions assigned to the identities. The method 1700 may be performed by a user equipment, such as UE 110 of FIG. 1 having multiple identities/subscriptions, or a MUSIM device. The method 1700 may be executed, e.g., at step 1603 of the flow chart of FIG. 16.

Figure 18:
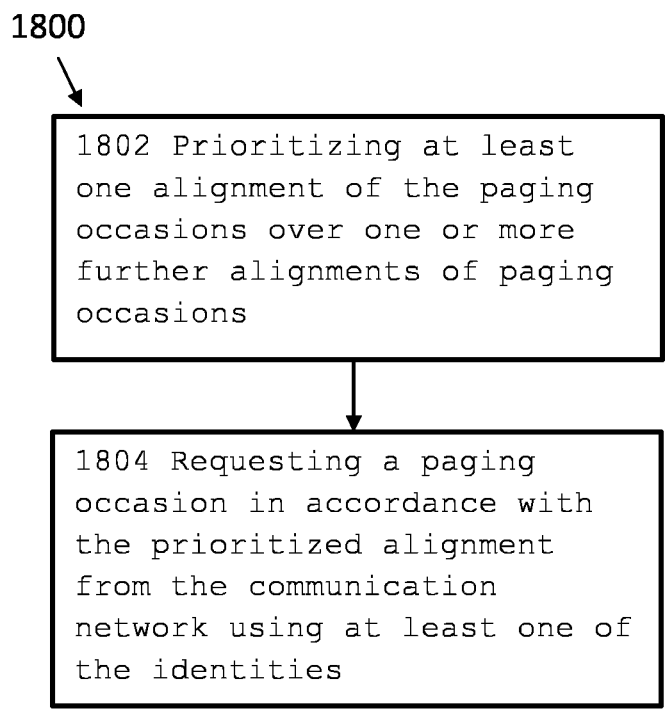
FIG. 18 shows another example method for reducing power consumption in dual receive capable MUSIM devices, based on the examples described herein.

FIG. 18 shows another example method 1800 for reducing power consumption in dual receive capable MUSIM devices, based on the examples described herein. At 1802, the method includes prioritizing at least one alignment of the paging occasions over one or more further alignments of paging occasions. At 1804, the method includes requesting a paging occasion in accordance with the prioritized alignment from the communication network using at least one of the identities. The method 1800 may be performed by a user equipment, such as UE 110 of FIG. 1 having multiple identities/subscriptions, or a MUSIM device. The method 1800 may be executed, e.g., at steps 1605 and 1606 of the flow chart of FIG. 16.

Figure 19:
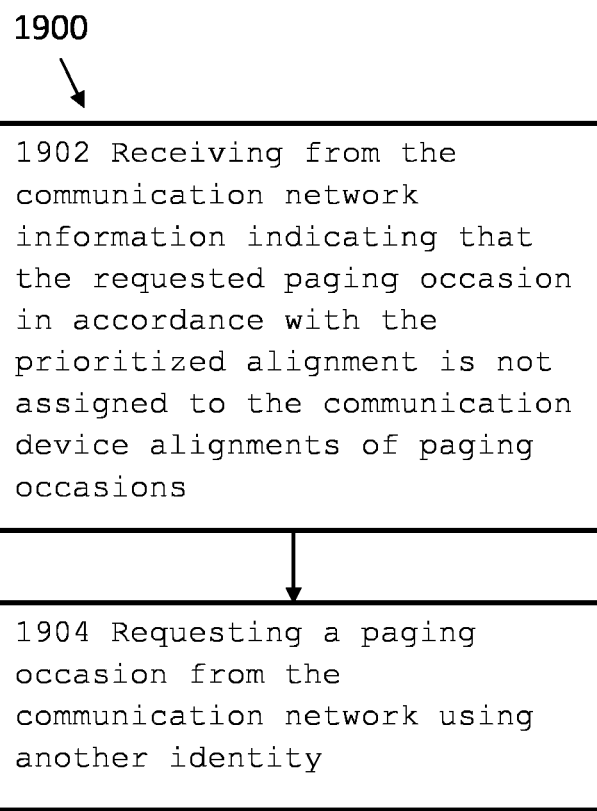
FIG. 19 shows another example method for reducing power consumption in dual receive capable MUSIM devices, based on the examples described herein.

FIG. 19 shows another example method 1900 for reducing power consumption in dual receive capable MUSIM devices, based on the examples described herein. At 1902, the method includes receiving from the communication network information indicating that the requested paging occasion in accordance with the prioritized alignment is not assigned to the communication device. At 1904, the method includes, in response to step 1902, requesting a paging occasion from the communication network using another identity. The method 1900 may be performed by a user equipment, such as UE 110 of FIG. 1 having multiple identities/subscriptions, or a MUSIM device. The method 1900 may be executed, e.g., at steps 1607 and 1609 of the flow chart of FIG. 16.

FIG. 20 shows another example method 2000 for reducing power consumption in dual receive capable MUSIM devices, based on the examples described herein. At 2002, the method includes receiving from the communication network information indicating that requesting a paging occasion from the communication network using another identity is not assigned. At 2004, the method includes, in response to step 2002, requesting a paging occasion from the communication network in accordance with at least one further alignment of paging occasions using the identity used for requesting the paging occasion in accordance with the prioritized alignment. The method 2000 may be performed by a user equipment, such as UE 110 of FIG. 1 having multiple identities/subscriptions, or a MUSIM device. The method 2000 may be executed, e.g., at steps 1610 and 1611 of the flow chart of FIG. 16.

Figure 21:
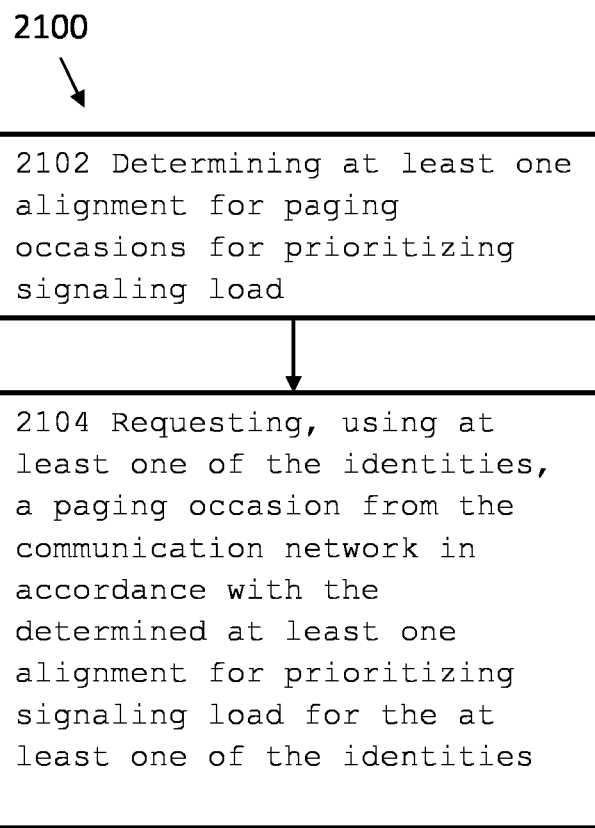
FIG. 21 shows another example method for reducing power consumption in dual receive capable MUSIM devices, based on the examples described herein.

FIG. 21 shows another example method 2100 for reducing power consumption in dual receive capable MUSIM devices, based on the examples described herein. At 2102, the method includes determining at least one alignment for paging occasions for prioritizing signaling load. At 2104, the method includes requesting, using at least one of the identities, a paging occasion from the communication network in accordance with the determined at least one alignment for prioritizing signaling load for the at least one of the identities. The method 2100 may be performed by a user equipment, such as UE 110 of FIG. 1 having multiple identities/subscriptions, or a MUSIM device. The method 2100 may be executed, e.g., at step 1609 of the flow chart of FIG. 16.

FIG. 22 shows another example method 2200 for reducing power consumption in dual receive capable MUSIM devices, based on the examples described herein. At 2202, the method includes receiving from the communication network information indicating that the requested paging occasion in accordance with the determined at least one alignment for paging occasions for prioritizing signaling load for the at least one of the identities is not assigned to the communication device. At 2204, the method includes, in response to step 2202, determining at least one alignment for prioritizing signaling load for paging occasions for another identity of the identities. At 2204, the method includes requesting, using the another identity, a paging occasion from the communication network in accordance with the determined at least one alignment for prioritizing signaling load for paging occasions for said another identity. The method 2200 may be performed by a user equipment, such as UE 110 of FIG. 1 having multiple identities/subscriptions, or a MUSIM device. The method 2200 may be executed, e.g., at steps 1610 and 1611 of the flow chart of FIG. 16.

FIG. 23 shows another example method for reducing power consumption in dual receive capable MUSIM devices, based on the examples described herein. The method may be performed by a user equipment, such as UE 110 of FIG. 1 having multiple identities/subscriptions, or a MUSIM device. At 2300, the method may start, when a device may determine a target level of alignment of the paging occasions, for example at 1603 of FIG. 16.

At 2301, the device may obtain mobility information. In an example, the device may obtain UE mobility statistics. The mobility statistics may indicate how often the UE transitions to a new Tracking Area (TA) and/or to a neighboring cell and/or how long does the UE camp in a cell.

At 2302, the mobility type may be determined on the basis of the obtained mobility information. In an example, the mobility type may be determined to be a high mobility user, when the device has transitioned outside of the TA more than x times in an observation time period. The x may be an integer value that is selected according to implementation. In an example, the mobility type may be determined to be a medium mobility user, when the device has remained in the tracking area during an observation time period but has transitioned often between cells within the TA. In an example, the mobility type may be determined to be a low mobility user or stationary user, when the device has remained in the same cell or a set of cells a large fraction of an observation time period.

At 2303, the mobility type of the device has been determined to be high mobility. Accordingly, the device may be a high mobility user. A target level of alignment of the device may be determined to be that no alignment is required, i.e. no-alignment requirement. In this case, the device may choose to not make an attempt to align the paging occasions for different identities, i.e. USIMs. Then, the target level of alignment may be a current alignment of the paging occasions the device has been assigned. It should be noted that the current alignment may mean that timing of the paging occasions are not aligned, i.e. they are misaligned, whereby their timing is not adapted with respect to each other to achieve an alignment, e.g., in accordance with the alignments describe with FIG. 4.

At 2305, the mobility type of the device has been determined to be medium mobility user. A target level of alignment of the device may be determined to be a partial alignment or a sequential alignment of paging occasion.

At 2304, the mobility type of the device has been determined to be low mobility user or a stationary user. A target level of alignment of the device may be determined to be a full alignment of paging occasion.

At 2306, the method may end after the device has determined a target level of alignment.

Figure 24:
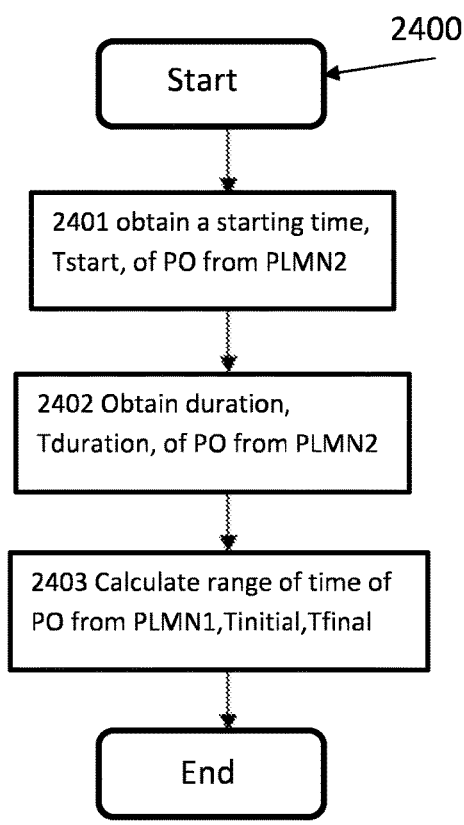
FIG. 24 shows another example method for reducing power consumption in dual receive capable MUSIM devices, based on the examples described herein.

FIG. 24 shows another example method for reducing power consumption in dual receive capable MUSIM devices, based on the examples described herein. The method may be performed by a user equipment, such as UE 110 of FIG. 1 having multiple identities/subscriptions, or a MUSIM device. The method provides a device to calculate a range of time for full or partial/sequential alignment for including information indicating the range of time to a request for obtaining a paging occasion from a PLMN. In the method the device knows paging occasion from PLMN2 and the range of time is calculated for a request for paging occasion from PLMN1. It should be note that the method may be applied also, when the device knows a paging occasion from PLMN1 and the range of time is calculated for a request for paging occasion from PLMN2. The method is described with reference to FIG. 25 that illustrates a range of time for reducing power consumption in dual receive capable MUSIM devices. At 2400, the method may start, in connection with the device requesting a paging occasion, for example at 1609 or 1611 of FIG. 16.

At 2401 the device may obtain a starting time, Tstart, of the paging occasion from PLMN2.

At 2402, the device may obtain a duration, Tduration, of the paging occasion from PLMN2.

In an example the starting time and duration in steps 2401 and 2402 may be obtained using a paging reception mechanism described above.

At 2403, the device may calculate a range of time of paging occasion from PLMN1. The range of time may be defined on the basis of an initial time, Tinitial, and a final time, Tfinal with respect to the paging occasion of PLMN2. Tinitial and Tfinal may be defined on the basis of the Tstart and Tduration of the paging occasion from PLMN2 as follows:

Tinitial=Tstart−Tduration.

Tfinal may be defined as follows:

Tfinal=Tstart+2*Tduration.

At 2404, the device has determined the range of time and the range of time or at least information indicating the range of time may be included in the request for paging occasion from PLMN1.

EXAMPLES

1. A method comprising:
  aligning a plurality of paging occasions across at least two identities of a communication device;
  wherein the aligning is performed via:
  requesting and receiving from a communication network a paging occasion for the communication device with at least two identities using at least one of the identities; or
  requesting and receiving from the communication network a reallocation of a paging offset using at least one of the identities.
2. The method of example 1, wherein the communication device comprises at least two receive chains.
3. The method of example 1, wherein the aligning is:
  a full alignment such that paging monitoring of at least two of the identities is simultaneous, and at least two receiver chains are active; or
  a sequential alignment such that paging monitoring of at least two of the identities is sequential in time; or
  a partial alignment such that paging monitoring of at least two of the identities partially overlap.
4. The method of any of examples 1 to 3, further comprising providing assistance information from at least one of the communication device's identities to the corresponding communication network to indicate a preferred location for the paging occasion.

5. The method of example 4, wherein the preferred location comprises at least one of:
a start slot and an end slot;
start frame and an end frame; and/or
a start time and an end time.
6. The method of any of examples 1 to 5, further comprising in response to receiving an indication of unavailability of the paging occasion from the communication network, requesting and receiving the paging occasion using a different one of the at least two identities.
7. The method of any of examples 1 to 6, further comprising determining capabilities of the communication device and/or a mobility type of the communication device; determining a target level of alignment of the paging occasions on the basis of the determined capabilities of the communication device and/or the determined mobility type of the communication device; and if a current level of alignment fails to meet the target level of alignment, requesting a new paging occasion for the communication device.
8. The method of any of examples 1 to 7, further comprising prioritizing at least one alignment of the paging occasions over one or more further alignments of paging occasions, and requesting a paging occasion in accordance with the prioritized alignment from the communication network using at least one of the identities.
9. The method of example 8, further comprising in response to receiving from the communication network information indicating that the requested paging occasion in accordance with the prioritized alignment is not assigned to the communication device, requesting a paging occasion from the communication network using another identity.
10. The method of example 9, further comprising, in response to receiving from the communication network information indicating that the requesting a paging occasion from the communication network using another identity is not assigned, requesting a paging occasion from the communication network in accordance with at least one further alignment of paging occasions using the identity used for requesting the paging occasion in accordance with the prioritized alignment.
11. The method of example 7, further comprising determining at least one alignment for paging occasions for prioritizing signaling load and requesting, using at least one of the identities, a paging occasion from the communication network in accordance with the determined at least one alignment for prioritizing signaling load for the at least one of the identities.
12. The method of example 11, further comprising in response to receiving from the communication network information indicating that the requested paging occasion in accordance with the determined at least one alignment for paging occasions for prioritizing signaling load for the at least one of the identities is not assigned to the communication device, determining at least one alignment for prioritizing signaling load for paging occasions for another identity of the identities, and requesting, using the another identity, a paging occasion from the communication network in accordance with the determined at least one alignment for prioritizing signaling load for paging occasions for said another identity.

13. The method of any of examples 1 to 12, wherein the at least two identities are subscription identities.
14. The method of any of examples 1 to 13, wherein the at least two identities are at least one of a SIM, a USIM, an e-SIM, or a certificate.
15. An apparatus comprising:
means for aligning a plurality of paging occasions across at least two identities of a communication device;
wherein the means for aligning comprises or are operatively connected to:
means for requesting and receiving from a communication network a paging occasion for the communication device with at least two identities using at least one of the identities; or
means for requesting and receiving from the communication network a reallocation of a paging offset using at least one of the identities.
16. The apparatus of example 15, wherein the communication device comprises at least two receive chains.
17. The apparatus of example 15, wherein the aligning is:
a full alignment such that paging monitoring of at least two of the identities is simultaneous, and at least two receiver chains are active; or
a sequential alignment such that paging monitoring of at least two of the identities is sequential in time; or
a partial alignment such that paging monitoring of at least two of the identities partially overlap.
18. The apparatus of any of examples 15 to 17, further comprising means for providing assistance information from at least one of the communication device's identities to the corresponding communication network to indicate a preferred location for the paging occasion.
19. The apparatus of example 18, wherein the preferred location comprises at least one of:
a start slot and an end slot;
a start frame and an end frame; and/or
a start time and an end time.
20. The apparatus of any of examples 15 to 19, further comprising means for, in response to receiving an indication of unavailability of the paging occasion from the communication network, requesting and receiving the paging occasion using a different one of the at least two identities.
21. The apparatus of any of examples 15 to 20, further comprising means for determining capabilities of the communication device and/or a mobility type of the communication device; means for determining a target level of alignment of the paging occasions on the basis of the determined capabilities of the communication device and/or the determined mobility type of the communication device; and means for, if a current level of alignment fails to meet the target level of alignment, requesting a new paging occasion for the communication device.
22. The apparatus of any of examples 1 to 21, further comprising means for prioritizing at least one alignment of the paging occasions over one or more further alignments of paging occasions, and means for requesting a paging occasion in accordance with the prioritized alignment from the communication network using at least one of the identities.
23. The apparatus of example 22, further comprising means for in response to receiving from the communication network information indicating that the requested paging occasion in accordance with the prioritized alignment is not assigned to the communication device, requesting a paging occasion from the communication network using another identity.

24. The apparatus of example 23, further comprising means for, in response to receiving from the communication network information indicating that the requesting a paging occasion from the communication network using another identity is not assigned, requesting a paging occasion from the communication network in accordance with at least one further alignment of paging occasions using the identity used for requesting the paging occasion in accordance with the prioritized alignment.

25. The apparatus of example 21, further comprising means for determining at least one alignment for paging occasions for prioritizing signaling load and means for requesting, using at least one of the identities, a paging occasion from the communication network in accordance with the determined at least one alignment for prioritizing signaling load for the at least one of the identities.

26. The apparatus of example 25, comprising means for in response to receiving from the communication network information indicating that the requested paging occasion in accordance with the determined at least one alignment for paging occasions for prioritizing signaling load for the at least one of the identities is not assigned to the communication device, determining at least one alignment for prioritizing signaling load for paging occasions for another identity of the identities, and means for requesting, using the another identity, a paging occasion from the communication network in accordance with the determined at least one alignment for prioritizing signaling load for paging occasions for said another identity.

27. The apparatus of any of examples 15 to 26, wherein the at least two identities are subscription identities.

28. The apparatus of any of examples 15 to 27, wherein the at least two identities are at least one of a SIM, a USIM, an e-SIM, or a certificate.

29. An apparatus comprising:
at least one processor; and
at least one non-transitory memory including computer program code;
wherein the at least one memory and the computer program code are configured to, with the at least one processor, cause the apparatus at least to perform:
aligning a plurality of paging occasions across at least two identities of a communication device;
wherein the aligning is performed via:
requesting and receiving from a communication network a paging occasion for the communication device with at least two identities using at least one of the identities; or
requesting and receiving from the communication network a reallocation of a paging offset using at least one of the identities.

30. The apparatus of example 29, wherein the communication device comprises at least two receive chains.

31. The apparatus of example 29, wherein the aligning is:
a full alignment such that paging monitoring of at least two of the identities is simultaneous, and at least two receiver chains are active; or
a sequential alignment such that paging monitoring of at least two of the identities is sequential in time; or
a partial alignment such that paging monitoring of at least two of the identities partially overlap.

32. The apparatus of any of examples 29 to 31, wherein the at least one memory and the computer program code are configured to, with the at least one processor, cause the apparatus to further perform: providing assistance information from at least one of the communication device's identities to the corresponding communication network to indicate a preferred location for the paging occasion.

33. The apparatus of example 32, wherein the preferred location comprises at least one of:
a start slot and an end slot;
a start frame and an end frame; and/or
a start time and an end time.

34. The apparatus of any of examples 29 to 33, wherein the at least one memory and the computer program code are configured to, with the at least one processor, cause the apparatus to further perform: in response to receiving an indication of unavailability of the paging occasion from the communication network, requesting and receiving the paging occasion using a different one of the at least two identities.

35. The apparatus of any of examples 29 to 34, wherein the at least one memory and the computer program code are configured to, with the at least one processor, cause the apparatus to further perform: determining capabilities of the communication device and/or a mobility type of the communication device; determining a target level of alignment of the paging occasions on the basis of the determined capabilities of the communication device and/or the determined mobility type of the communication device; and if a current level of alignment fails to meet the target level of alignment, requesting a new paging occasion for the communication device.

36. The apparatus of any of examples 29 to 35, wherein the at least one memory and the computer program code are configured to, with the at least one processor, cause the apparatus to further perform: prioritizing at least one alignment of the paging occasions over one or more further alignments of paging occasions, and requesting a paging occasion in accordance with the prioritized alignment from the communication network using at least one of the identities.

37. The apparatus of example 36, wherein the at least one memory and the computer program code are configured to, with the at least one processor, cause the apparatus to further perform: in response to receiving from the communication network information indicating that the requested paging occasion in accordance with the prioritized alignment is not assigned to the communication device, requesting a paging occasion from the communication network using another identity.

38. The apparatus of example 37, wherein the at least one memory and the computer program code are configured to, with the at least one processor, cause the apparatus to further perform: in response to receiving from the communication network information indicating that the requesting a paging occasion from the communication network using another identity is not assigned, requesting a paging occasion from the communication network in accordance with at least one further alignment of paging occasions using the identity used for requesting the paging occasion in accordance with the prioritized alignment.

39. The apparatus of example 35, wherein the at least one memory and the computer program code are configured to, with the at least one processor, cause the apparatus to further perform: determining at least one alignment for paging occasions for prioritizing signaling load and requesting, using at least one of the identities, a paging occasion from the communication network in accordance with the determined at least one alignment for prioritizing signaling load for the at least one of the identities.

40. The apparatus of example 39, wherein the at least one memory and the computer program code are configured to, with the at least one processor, cause the apparatus to further perform: in response to receiving from the communication network information indicating that the requested paging occasion in accordance with the determined at least one alignment for paging occasions for prioritizing signaling load for the at least one of the identities is not assigned to the communication device, determining at least one alignment for prioritizing signaling load for paging occasions for another identity of the identities, and requesting, using the another identity, a paging occasion from the communication network in accordance with the determined at least one alignment for prioritizing signaling load for paging occasions for said another identity.

41. The apparatus of any of examples 29 to 40, wherein the at least two identities are subscription identities.

42. The apparatus of any of examples 29 to 41, wherein the at least two identities are at least one of a SIM, a USIM, an e-SIM, or a certificate.

43. A non-transitory program storage device readable by a machine, tangibly embodying a program of instructions executable by the machine for performing operations, the operations comprising:
aligning a plurality of paging occasions across at least two identities of a communication device;
wherein the aligning is performed via:
requesting and receiving from a communication network a paging occasion for the communication device with at least two identities using at least one of the identities; or
requesting and receiving from the communication network a reallocation of a paging offset using at least one of the identities.

44. The apparatus of example 43, wherein the communication device comprises at least two receive chains.

45. The apparatus of example 43, wherein the aligning is:
a full alignment such that paging monitoring of at least two of the identities is simultaneous, and at least two receiver chains are active; or
a sequential alignment such that paging monitoring of at least two of the identities is sequential in time; or
a partial alignment such that paging monitoring of at least two of the identities partially overlap.

46. The apparatus of any of examples 43 to 45, wherein the operations further comprising: providing assistance information from at least one of the communication device's identities to the corresponding communication network to indicate a preferred location for the paging occasion.

47. The apparatus of example 46, wherein the preferred location comprises at least one of:
a start slot and an end slot;
a start frame and an end frame; and/or
a start time and an end time.

48. The apparatus of any of examples 43 to 47, wherein the operations further comprising: in response to receiving an indication of unavailability of the paging occasion from the communication network, requesting and receiving the paging occasion using a different one of the at least two identities.

49. The apparatus of any of examples 43 to 48, wherein the operations further comprising: determining capabilities of the communication device and/or a mobility type of the communication device; determining a target level of alignment of the paging occasions on the basis of the determined capabilities of the communication device and/or the determined mobility type of the communication device; and if a current level of alignment fails to meet the target level of alignment, requesting a new paging occasion for the communication device.

50. The apparatus of any of examples 43 to 49, wherein the operations further comprising: prioritizing at least one alignment of the paging occasions over one or more further alignments of paging occasions, and requesting a paging occasion in accordance with the prioritized alignment from the communication network using at least one of the identities.

51. The apparatus of example 50, wherein the operations further comprising: in response to receiving from the communication network information indicating that the requested paging occasion in accordance with the prioritized alignment is not assigned to the communication device, requesting a paging occasion from the communication network using another identity.

52. The apparatus of example 51, wherein the operations further comprising: in response to receiving from the communication network information indicating that the requesting a paging occasion from the communication network using another identity is not assigned, requesting a paging occasion from the communication network in accordance with at least one further alignment of paging occasions using the identity used for requesting the paging occasion in accordance with the prioritized alignment.

53. The apparatus of example 49, wherein the operations further comprising: determining at least one alignment for paging occasions for prioritizing signaling load and requesting, using at least one of the identities, a paging occasion from the communication network in accordance with the determined at least one alignment for prioritizing signaling load for the at least one of the identities.

54. The apparatus of example 53, wherein the operations further comprising: in response to receiving from the communication network information indicating that the requested paging occasion in accordance with the determined at least one alignment for paging occasions for prioritizing signaling load for the at least one of the identities is not assigned to the communication device, determining at least one alignment for prioritizing signaling load for paging occasions for another identity of the identities, and requesting, using the another identity, a paging occasion from the communication network in accordance with the determined at least one alignment for prioritizing signaling load for paging occasions for said another identity.

55. The apparatus of any of examples 43 to 54, wherein the at least two identities are subscription identities.

56. The apparatus of any of examples 43 to 55, wherein the at least two identities are at least one of a SIM, a USIM, an e-SIM, or a certificate.

57. An apparatus comprising:
circuitry configured to align a plurality of paging occasions across at least two identities of a communication device;
wherein the circuitry configured to align comprises or is operatively connected to:
circuitry configured to request and receive from a communication network a paging occasion for the communication device with at least two identities using at least one of the identities;
circuitry configured to request and receive from the communication network a reallocation of a paging offset using at least one of the identities.

58. The apparatus of example 57, wherein the communication device comprises at least two receive chains.

59. The apparatus of example 57, wherein the aligning is:
a full alignment such that paging monitoring of at least two of the identities is simultaneous, and at least two receiver chains are active; or
a sequential alignment such that paging monitoring of at least two of the identities is sequential in time; or
a partial alignment such that paging monitoring of at least two of the identities partially overlap.

60. The apparatus of any of examples 57 to 59, wherein the circuitry configured to align comprises or is further operatively connected to: circuitry configured to provide assistance information from at least one of the communication device's identities to the corresponding communication network to indicate a preferred location for the paging occasion.

61. The apparatus of example 60, wherein the preferred location comprises at least one of:
a start slot and an end slot;
a start frame and an end frame; and/or
a start time and an end time.

62. The apparatus of any of examples 57 to 61, wherein the circuitry configured to align comprises or is further operatively connected to: circuitry configured to, in response to receiving an indication of unavailability of the paging occasion from the communication network, request and receive the paging occasion using a different one of the at least two identities.

63. The apparatus of any of examples 57 to 62, wherein the circuitry configured to align comprises or is further operatively connected to: circuitry configured to determine capabilities of the communication device and/or a mobility type of the communication device; circuitry configured to determine a target level of alignment of the paging occasions on the basis of the determined capabilities of the communication device and/or the determined mobility type of the communication device; and circuitry configured to, if a current level of alignment fails to meet the target level of alignment, request a new paging occasion for the communication device.

64. The apparatus of any of examples 57 to 63, wherein the circuitry configured to align comprises or is further operatively connected to: circuitry configured to prioritize at least one alignment of the paging occasions over one or more further alignments of paging occasions, and circuitry configured to request a paging occasion in accordance with the prioritized alignment from the communication network using at least one of the identities.

65. The apparatus of example 64, wherein the circuitry configured to align comprises or is further operatively connected to: circuitry configured to, in response to receiving from the communication network information indicating that the requested paging occasion in accordance with the prioritized alignment is not assigned to the communication device, request a paging occasion from the communication network using another identity.

66. The apparatus of example 65, wherein the circuitry configured to align comprises or is further operatively connected to: circuitry configured to, in response to receiving from the communication network information indicating that the requesting a paging occasion from the communication network using another identity is not assigned, request a paging occasion from the communication network in accordance with at least one further alignment of paging occasions using the identity used for requesting the paging occasion in accordance with the prioritized alignment.

67. The apparatus of example 63, wherein the circuitry configured to align comprises or is further operatively connected to: circuitry configured to determine at least one alignment for paging occasions for prioritizing signaling load and circuitry configured to request, using at least one of the identities, a paging occasion from the communication network in accordance with the determined at least one alignment for prioritizing signaling load for the at least one of the identities.

68. The apparatus of example 67, wherein the circuitry configured to align comprises or is further operatively connected to: circuitry configured to, in response to receiving from the communication network information indicating that the requested paging occasion in accordance with the determined at least one alignment for paging occasions for prioritizing signaling load for the at least one of the identities is not assigned to the communication device, determine at least one alignment for prioritizing signaling load for paging occasions for another identity of the identities, and circuitry configured to request, using the another identity, a paging occasion from the communication network in accordance with the determined at least one alignment for prioritizing signaling load for paging occasions for said another identity.

69. The apparatus of any of examples 57 to 68, wherein the at least two identities are subscription identities.

70. The apparatus of any of examples 57 to 69, wherein the at least two identities are at least one of a SIM, a USIM, an e-SIM, or a certificate.

Although the above examples describe embodiments of the invention performed by an apparatus, device, communication device, wireless device, mobile terminal or user equipment, it would be appreciated that the invention as described above may be implemented as a part of any apparatus that comprises circuity and/or that supports multiple active identities, e.g., USIMs, for communications with communications networks.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
  (a) hardware-only circuit implementations (such as implementations in only analogue and/or digital circuitry) and
  (b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
  aligning, by a communication device, a plurality of paging occasions across at least two identities of the communication device, wherein the at least two identities are subscription identities, wherein the aligning is performed via at least one of the following:
    requesting and receiving, by the communication device, from a communication network a paging occasion for the communication device with at least two identities using at least one of the identities, the method further comprising in response to receiving an indication of unavailability of the paging occasion from the communication network, requesting and receiving the paging occasion using a different one of the at least two identities; or
    requesting and receiving, by the communication device, from the communication network a reallocation of a paging offset using at least one of the identities;
  determining, by the communication device, a target level of alignment of the paging occasions; and
  if a current level of alignment fails to meet the target level of alignment, requesting a new paging occasion for the communication device.

2. The method of claim 1, wherein the communication device comprises at least two receive chains.

3. The method of claim 1, wherein the aligning comprises at least one of:
  a full alignment such that paging monitoring of at least two of the identities is simultaneous, and at least two receiver chains are active;
  a sequential alignment such that paging monitoring of at least two of the identities is sequential in time; or
  a partial alignment such that paging monitoring of at least two of the identities partially overlap.

4. The method of claim 1, further comprising:
  providing assistance information from at least one of the communication device's identities to the corresponding communication network to indicate a preferred location for the paging occasion.

5. The method of claim 4, wherein the preferred location comprises at least one of:
  a start slot and an end slot;
  a start frame and an end frame; and/or
  a start time and an end time.

6. The method of claim 1, further comprising:
  determining at least one of: a capabilities of the communication device, a mobility type of the communication device, or a power consumption of the communication device; and
  wherein the determining the target level comprises determining a target level of alignment of the paging occasions on the basis of at least one of the determined capabilities of the communication device, the determined mobility type of the communication device or the power consumption of the communication device.

7. The method of claim 1, further comprising:
  prioritizing at least one alignment of the paging occasions over one or more further alignments of paging occasions; and
  requesting a paging occasion in accordance with the prioritized alignment from the communication network using at least one of the identities.

8. The method of claim 7, further comprising:
  in response to receiving from the communication network information indicating that the requested paging occasion in accordance with the prioritized alignment is not assigned to the communication device, requesting a paging occasion from the communication network using another identity.

9. The method of claim 8, further comprising:
  in response to receiving from the communication network information indicating that the requesting a paging occasion from the communication network using another identity is not assigned, requesting a paging occasion from the communication network in accordance with at least one further alignment of paging occasions using the identity used for requesting the paging occasion in accordance with the prioritized alignment.

10. The method of claim 6, further comprising:
    determining at least one alignment for paging occasions for prioritizing signaling load; and
    requesting, using at least one of the identities, a paging occasion from the communication network in accordance with the determined at least one alignment for prioritizing signaling load for the at least one of the identities.

11. The method of claim 10, further comprising:
    in response to receiving from the communication network information indicating that the requested paging occasion in accordance with the determined at least one alignment for paging occasions for prioritizing signaling load for the at least one of the identities is not assigned to the communication device, determining at least one alignment for prioritizing signaling load for paging occasions for another identity of the identities; and
    requesting, using the another identity, a paging occasion from the communication network in accordance with the determined at least one alignment for prioritizing signaling load for paging occasions for said another identity.

12. The method of claim 1, wherein the at least two identities are at least one of a SIM, a USIM, an e-SIM, or a certificate.

13. An apparatus comprising:
    at least one processor; and
    at least one memory including computer program code;
    the at least one memory and the computer program code configured to, with the at least one processor, cause the apparatus at least to:
    align, by a communication device, a plurality of paging occasions across at least two identities of the communication device, wherein the at least two identities are subscription identities, wherein the aligning is performed via at least one of the following;
        request and receive, by the communication device, from a communication network a paging occasion for the communication device with at least two identities using at least one of the identities, and further in response to receiving an indication of unavailability of the paging occasion from the communication network, requesting and receiving the paging occasion using a different one of the at least two identities; or
        request and receive, by the communication device, from the communication network a reallocation of a paging offset using at least one of the identities;
    determine, by the communication device, a target level of alignment of the paging occasions; and
    if a current level of alignment fails to meet the target level of alignment, request a new paging occasion for the communication device.

14. The apparatus of claim 13, wherein the computer program code and the processor are configured to further cause the apparatus to:
    provide assistance information from at least one of the communication device's identities to the corresponding communication network to indicate a preferred location for the paging occasion.

15. The apparatus of claim 14, wherein the preferred location comprises at least one of:
    a start slot and an end slot;
    a start frame and an end frame; and/or
    a start time and an end time.

16. The apparatus of claim 13, wherein the computer program code and the processor are configured to further cause the apparatus to:
    determine at least one of: a capabilities of the communication device, a mobility type of the communication device, or a power consumption of the communication device; and
    wherein the computer program code and the processor configured to cause the apparatus to determine the target level comprises the computer program code and the processor configured to cause the apparatus to determine a target level of alignment of the paging occasions on the basis of the determined capabilities of the communication device and/or the determined mobility type of the communication device.

17. The apparatus of claim 13, wherein the computer program code and the processor are configured to further cause the apparatus to:
    prioritize at least one alignment of the paging occasions over one or more further alignments of paging occasions; and
    request a paging occasion in accordance with the prioritized alignment from the communication network using at least one of the identities.

18. The apparatus of claim 17, wherein the computer program code and the processor are configured to further cause the apparatus to:
    in response to receiving from the communication network information indicating that the requested paging occasion in accordance with the prioritized alignment is not assigned to the communication device, request a paging occasion from the communication network using another identity.

19. The apparatus of claim 18, wherein the computer program code and the processor are configured to further cause the apparatus to:
    in response to receiving from the communication network information indicating that the requesting a paging occasion from the communication network using another identity is not assigned, request a paging occasion from the communication network in accordance with at least one further alignment of paging occasions using the identity used for requesting the paging occasion in accordance with the prioritized alignment.

20. An apparatus comprising:
    at least one processor; and
    at least one memory including computer program code;
    the at least one memory and the computer program code configured to, with the at least one processor, cause the apparatus at least to:
    align, by a communication device, a plurality of paging occasions across at least two identities of the communication device, wherein the at least two identities are subscription identities, wherein the aligning is performed via at least one of the following;
        request and receive, by the communication device, from a communication network a paging occasion for the communication device with at least two identities using at least one of the identities, and further in response to receiving an indication of unavailability of the paging occasion from the communication network, requesting and receiving the paging occasion using a different one of the at least two identities; or
        request and receive, by the communication device, from the communication network a reallocation of a paging offset using at least one of the identities;

prioritize at least one alignment of the paging occasions over one or more further alignments of paging occasions; and request a paging occasion in accordance with the prioritized alignment from the communication network using at least one of the identities.

21. The apparatus of claim 20, wherein the computer program code and the processor are configured to further cause the apparatus to:

in response to receiving from the communication network information indicating that the requested paging occasion in accordance with the prioritized alignment is not assigned to the communication device, request a paging occasion from the communication network using another identity.

* * * * *